United States Patent
Yokoi

(10) Patent No.: US 10,289,236 B2
(45) Date of Patent: May 14, 2019

(54) DISPLAY

(71) Applicant: Japan Display Inc., Tokyo (JP)

(72) Inventor: Hirokazu Yokoi, Tokyo (JP)

(73) Assignee: Japan Display Inc., Tokyo (JP)

( * ) Notice: Subject to any disclaimer, the term of this patent is extended or adjusted under 35 U.S.C. 154(b) by 414 days.

(21) Appl. No.: 15/084,049

(22) Filed: Mar. 29, 2016

(65) Prior Publication Data

US 2016/0291786 A1    Oct. 6, 2016

(30) Foreign Application Priority Data

Apr. 3, 2015 (JP) .................................. 2015-076918
Feb. 10, 2016 (JP) .................................. 2016-023466

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04101* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 2010/0194698 A1* | 8/2010 | Hotelling | G06F 1/3218 345/173 |
| 2012/0050659 A1 | 3/2012 | Nakanishi et al. | |
| 2014/0192012 A1 | 7/2014 | Kurasawa | |

FOREIGN PATENT DOCUMENTS

| | | |
|---|---|---|
| JP | 2012-047807 A | 3/2012 |
| JP | 2014-134900 A | 7/2014 |

* cited by examiner

*Primary Examiner* — Joseph R Haley
*Assistant Examiner* — Emily J Frank
(74) *Attorney, Agent, or Firm* — Michael Best & Friedrich LLP

(57) ABSTRACT

To provide a display in which the convergence of potential fluctuation toward the GND potential is improved, while the switch on the driver IC side is kept small.
The display includes a plurality of drive electrodes for display and touch detection; a drive electrode driver configured to apply a driving signal to each of the plurality of the drive electrodes; and a first driving signal selector unit and a second driving signal selector unit configured to select each of the plurality of the drive electrodes to which the drive electrode driver applies the driving signal. A ground wiring line to which the drive electrode selected by the first driving signal selector unit is connected in a touch detection period is formed on a substrate on which the plurality of the drive electrodes are formed.

10 Claims, 17 Drawing Sheets

FIG. 13

| | DISPLAY PERIOD 1 | TOUCH DETECTION PERIOD 1 | DISPLAY PERIOD 2 | TOUCH DETECTION PERIOD 2 |
|---|---|---|---|---|
| SIO[0] | ⎍ | | | |
| SIO[1] | | ‾‾‾‾‾‾‾‾‾‾‾‾ | | ‾‾‾‾‾‾‾ |
| SIO[2] | | | ‾‾‾‾ | ‾‾‾‾‾‾‾ |
| SO0 | Vcom | GND | | |
| SI1U | | | | |
| SI2U | ◄── DISPLAY PERIOD ──► ◄── STATE (2) ──► | | | |
| SI3U | STATE (1) → ← → ← STATE (1) | | | |
| ⋮ | | | | |
| SInU | | | | |
| SI1L | | ‾‾‾‾‾‾‾‾‾‾‾‾ | | |
| SI2L | | | | ‾‾‾‾‾‾‾ |
| SI3L | | | | |
| ⋮ | | | | |
| SInL | | | | |
| SO1U | Vcom | GND(DIRECT) | | |
| SO2U | Vcom | | | GND(DIRECT) |
| SO3U | Vcom | | | |
| ⋮ | | | | |
| SOnU | Vcom | | | |
| SO1L | Vcom | GND(DRIVE ELECTRODE DRIVER) | | Hi-z |
| SO2L | Vcom | Hi-z | | GND(DRIVE ELECTRODE DRIVER) |
| SO3L | Vcom | Hi-z | | Hi-z |
| ⋮ | | | | |
| SOnL | Vcom | Hi-z | | Hi-z |
| COML1 | Vcom | GND | | |
| COML2 | Vcom | | | GND |
| COML3 | Vcom | | | |
| ⋮ | | | | |
| COMLn | Vcom | | | |

FIG. 14

| | DISPLAY PERIOD 3 | TOUCH DETECTION PERIOD 3 | DISPLAY PERIOD n | TOUCH DETECTION PERIOD n |
|---|---|---|---|---|
| SIO[0] | | | | |
| SIO[1] | | | | |
| SIO[2] | | | | |
| SO0 | Vcom | GND | | |
| SI1U | | | | |
| SI2U | | | | |
| SI3U ⋮ SInU | | | | |
| SI1L | | | | |
| SI2L | | | | |
| SI3L ⋮ SInL | | | | |
| SO1U | Vcom | | | |
| SO2U | Vcom | | | |
| SO3U ⋮ SOnU | Vcom Vcom | GND(DIRECT) | | GND(DIRECT) |
| SO1L | Vcom | Hi-z | | Hi-z |
| SO2L | Vcom | Hi-z | | Hi-z |
| SO3L ⋮ SOnL | Vcom Vcom | GND(DRIVE ELECTRODE DRIVER) Hi-z | | Hi-z GND(DRIVE ELECTRODE DRIVER) |
| COML1 | Vcom | | | |
| COML2 | Vcom | | | |
| COML3 ⋮ COMLn | Vcom Vcom | GND | | GND |

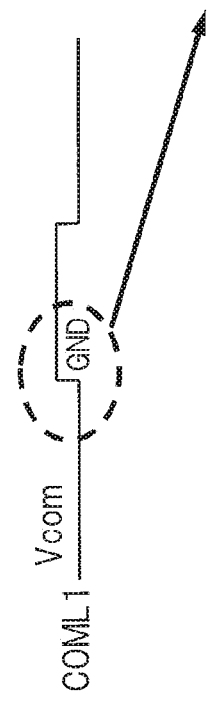
FIG. 15A
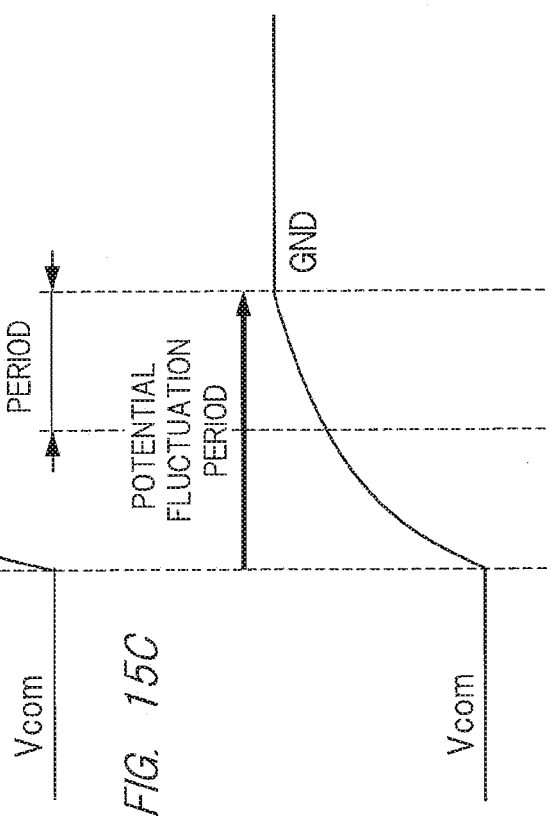
FIG. 15B
FIG. 15C

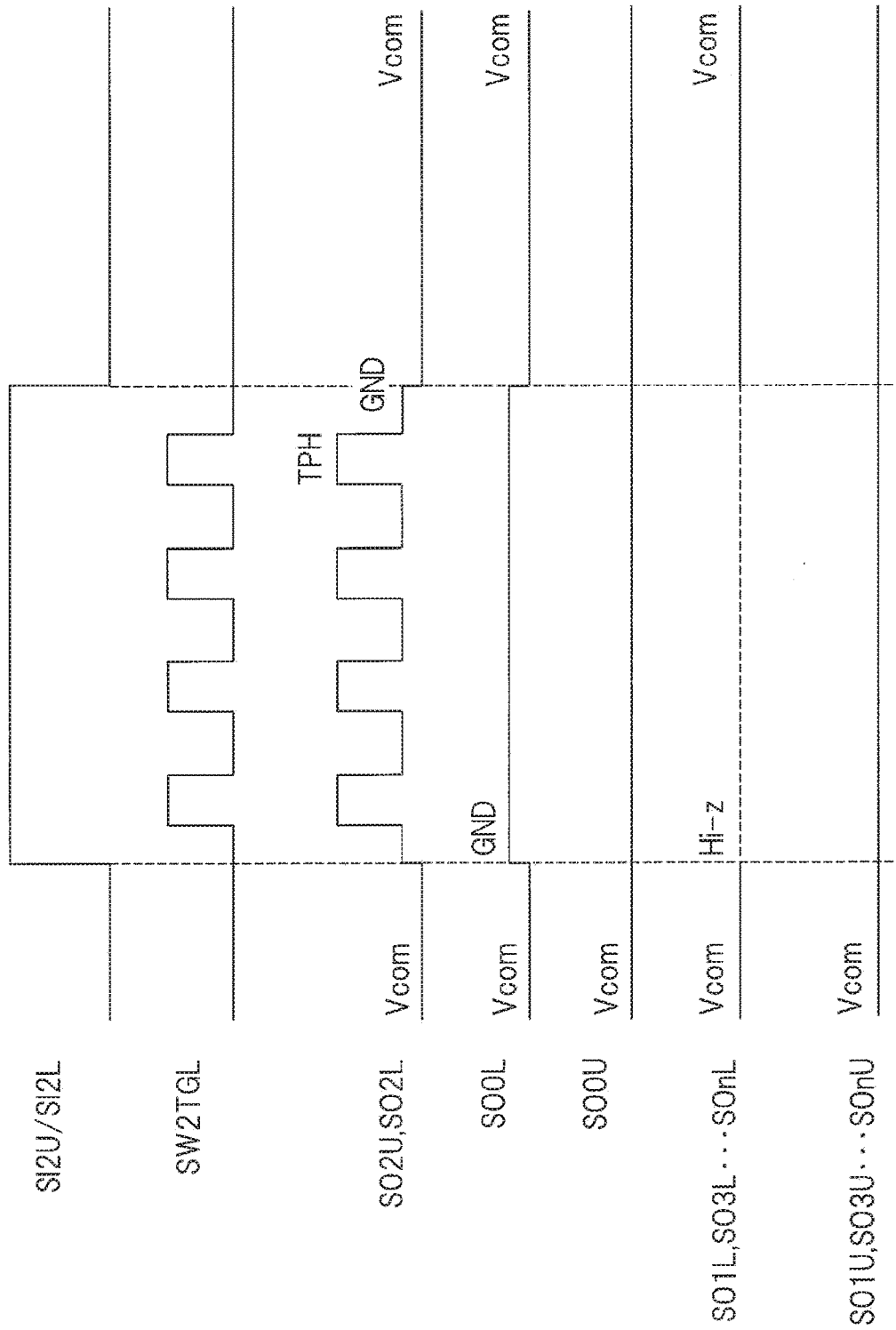

DISPLAY

CROSS-REFERENCE TO RELATED APPLICATION

The present application claims priorities from Japanese Patent Application No. 2015-076918 filed on Apr. 3, 2015 and Japanese Patent Application No. 2016-023466 filed on Feb. 10, 2016, the content of which is hereby incorporated by reference into this application.

TECHNICAL FIELD OF THE INVENTION

The present invention relates to a display, and particularly relates to a display with a touch detection function capable of detecting an external proximity object.

BACKGROUND OF THE INVENTION

Recently, a touch detection device called a touch panel, which is capable of detecting an external proximity object, has been receiving attention. The touch panel is used for a display with a touch detection function, in which the touch panel is mounted on or integrated with a display such as a liquid crystal display. The display with a touch detection function displays various button images on the display, thereby making it possible to input information by means of the touch panel instead of by means of a conventional mechanical button. The display with a touch detection function, which has such a touch panel, does not need an input device such as a keyboard, mouse, and a keypad. For this reason, the use of the touch panel is expanding, not only in a computer, but also a portable information terminal such as a mobile phone.

There are several kinds of methods used for the touch detection device, including an optical method, a resistive method, and a capacitive method. Particularly, the touch detection device using a capacitive method has a relatively simple structure, requiring low power consumption. The touch detection device is, therefore, used for a portable information terminal, and the like. For example, capacitive touch panels are described in Japanese Patent Application Laid-Open Publication No. 2014-134900 (Patent Document 1) and Japanese Patent Application Laid-Open Publication No. 2012-047807 (Patent Document 2).

SUMMARY OF THE INVENTION

It is known, for example, that a drive electrode is used for both display and touch detection, when the display with a touch detection function described above has the touch detection function built-in. In this case, a touch detection circuit and a display circuit share a driving signal wiring line which provides a driving signal (Vcom potential) to the drive electrode. In a touch detection period, a relevant detection region is separated from the Vcom potential of a driver integrated circuit (IC), so that both the touch detection circuit and the display circuit are operated.

In a display period, it is necessary that the driving signal provided to the drive electrode has a potential with an offset from a ground (GND) potential, due to the existence of a feedthrough of a pixel gate circuit. In the touch detection period, on the other hand, it is desirable that the GND potential be output, in order to eliminate noise from an internal power supply of the driver IC.

Normally, a circuit to separate the detection region is placed inside a panel. The panel, therefore, requires a space therein to place the circuit. In particular, when the detection region is divided lengthwise, driver IC components and touch detection circuits are concentrated, and therefore more space is required in a longitudinal direction than in a transverse direction. In this case, therefore, a wiring line on a surface on which the driver IC is mounted, which is selected at the time of touch detection, is switched between the Vcom potential and the GND potential, so that the frame increase on the driver IC-mounted surface side can be prevented.

The configuration described above is effective in preventing the frame increase in the panel. However, the convergence of potential fluctuation toward the GND potential is poor, unless the switch on the driver IC is large enough such that the switch resistance is sufficiently low, because total current flows through the switch inside the driver IC, when the driving signal is switched to the GND potential at the time of touch detection. In the aforementioned Patent Documents 1 and 2, the convergence of potential fluctuation toward the GND potential is not taken into consideration.

In view of the foregoing, an objective of the present invention is to provide a display in which the convergence of potential fluctuation toward the GND potential is improved, while the switch on the driver IC side is kept small.

According to an embodiment of the present invention, a display includes a plurality of drive electrodes for display and touch detection; a drive electrode driver configured to apply a driving signal to each of the plurality of the drive electrodes; and a driving signal selector unit configured to select each of the plurality of the drive electrodes to which the drive electrode driver applies the driving signal. A ground wiring line to which the drive electrode selected by the driving signal selector unit is connected in a touch detection period is formed on a substrate on which the plurality of the drive electrodes are formed.

As another embodiment of the present invention, a display includes a plurality of drive electrodes for display and touch detection; a drive electrode driver configured to apply a driving signal to each of the plurality of the drive electrodes; and a first driving signal selector unit and a second driving signal selector unit configured to select each of the plurality of the drive electrodes to which the drive electrode driver applies the driving signal. A touch detection period and a display period alternate with each other, and in the touch detection period, the drive electrode driver provides a driving signal for touch detection to the drive electrode, and in the display period, the drive electrode driver provides a driving signal for display to the drive electrode, and a ground wiring line to which the drive electrode selected by the first driving signal selector unit is connected in the touch detection period is formed on a substrate on which the plurality of the drive electrodes are formed.

As another embodiment of the present invention, in the touch detection period, the drive electrode selected by the first driving signal selector unit is connected to the ground wiring line on the substrate, and the drive electrode selected by the second driving signal selector unit is connected to a ground potential in the drive electrode driver.

As another embodiment of the present invention, in the touch detection period, the drive electrode which is not selected by the first driving signal selector unit is connected to a driving signal wiring line on the substrate, and the drive electrode which is not selected by the second driving signal selector unit is in a high impedance state.

BRIEF DESCRIPTIONS OF THE DRAWINGS

FIG. 13 is a timing chart showing an example of an operation of the drive circuit of the drive electrode according to the first embodiment of the invention;

FIG. 14 is a timing chart, which is the continuation of FIG. 13, showing an example of an operation of the drive circuit of the drive electrode;

Figure 16B:
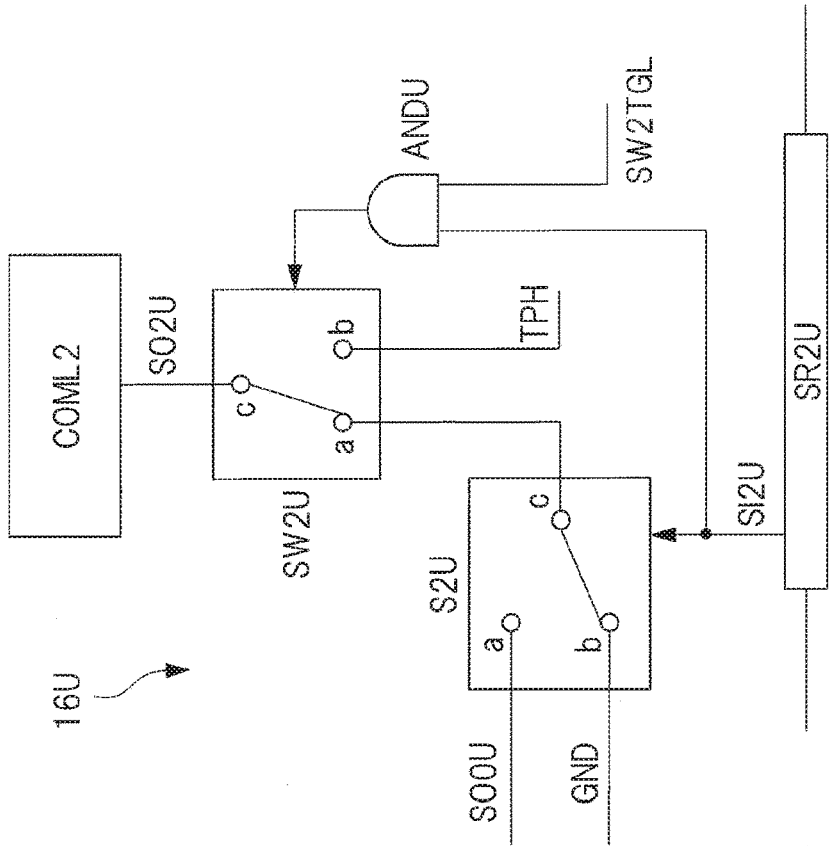
Figure 16A:
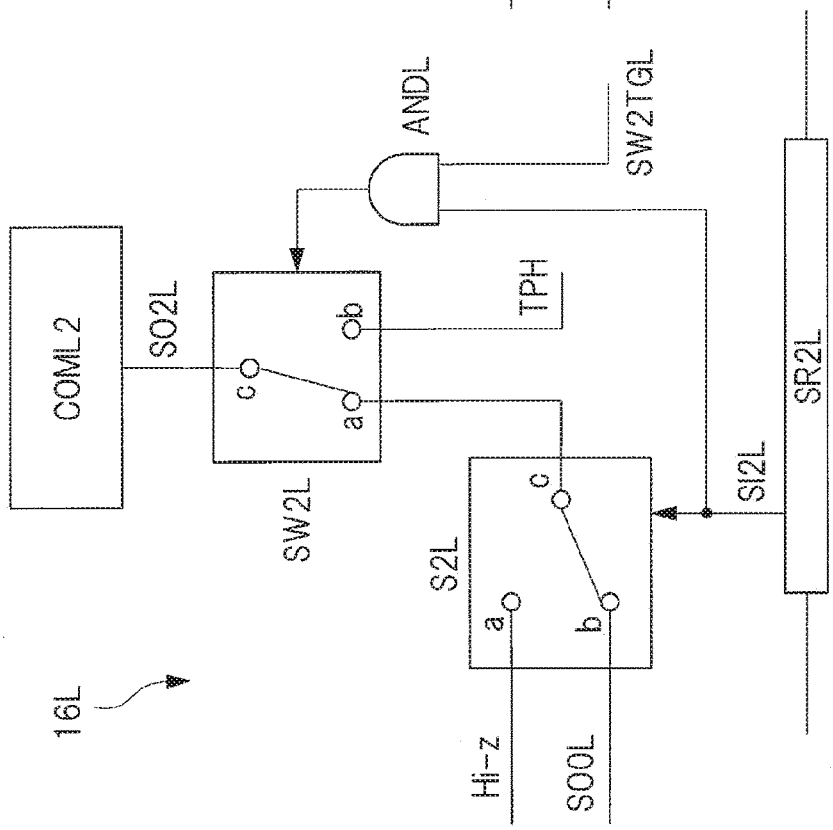

FIGS. 15A, 15B, and 15C are explanatory diagrams showing a difference between the first embodiment of the invention and a comparative example in the convergence of potential fluctuation toward the GND potential;

FIGS. 16A and 16B are explanatory diagrams showing an example of a configuration of the drive electrode and a drive circuit thereof, according to a second embodiment of the invention; and FIG. 17 is a timing chart showing an example of an operation (touch detection period (state (2))) of the drive circuit of the drive electrode according to the second embodiment of the invention;

DESCRIPTIONS OF THE PREFERRED EMBODIMENTS

Hereinafter, embodiments of the present invention will be described with reference to drawings. Note that the disclosures are provided byway of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention.

Further, in the specification and drawings, elements which are similar to those already mentioned with respect to previous drawings are denoted by the same reference characters, and detailed descriptions thereof will be suitably omitted.

First Embodiment

The display with a touch detection function, according to an embodiment of the invention, will be described below with reference to FIGS. 1 to 15.

<Display with Touch Detection Function>

Figure 1:
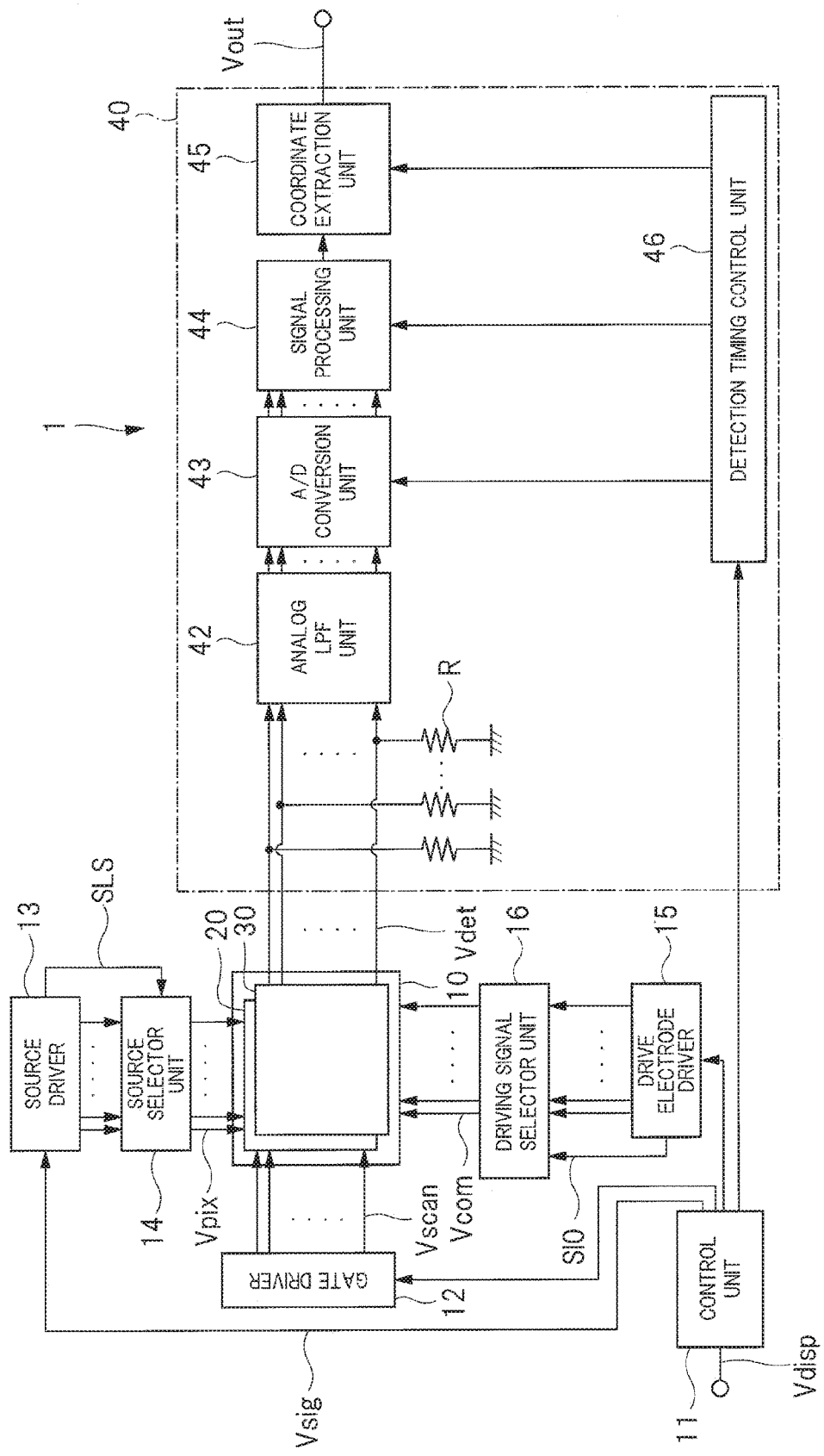
FIG. 1 is a block diagram showing an example of a schematic configuration of a display with a touch detection function according to a first embodiment of the invention.

First, a configuration of the display with a touch detection function, according to the present embodiment, will be described below with reference to FIG. 1. FIG. 1 is a block diagram showing an example of a schematic configuration of a display with a touch detection function according to the present embodiment.

The display with a touch detection function 1 includes a display device with a touch detection function 10, a control unit 11, a gate driver 12, a source driver 13, a source selector unit 14, a drive electrode driver 15, a driving signal selector unit 16, and a touch detection section 40. In the display with a touch detection function 1, the display device with a touch detection function 10 means a display device having a built-in touch detection function.

The display device with a touch detection function 10 is an "in-cell" type device in which a capacitive touch detection device 30 is integrated with a liquid crystal display device 20 using a liquid crystal display element as a display element. The display device with a touch detection function 10 may also be an "on-cell" type device in which a capacitive touch detection device 30 is mounted on a liquid crystal display device 20 using a liquid crystal display element as a display element.

The liquid crystal display device 20 is a device which scans a horizontal line one by one sequentially, responding to a scanning signal Vscan provided from the gate driver 12, to display an image.

The control unit 11 is a circuit which controls the gate driver 12, the source driver 13, the drive electrode driver 15, and the touch detection section 40, by providing a control signal to each of them, based on an externally provided video signal Vdisp, so that the gate driver 12, the source driver 13, the drive electrode driver 15, and the touch detection section 40, can operate synchronously with each other.

The gate driver 12 has a function to sequentially select one horizontal line, which is an object to be driven for display, of the display device with a touch detection function 10, based on a control signal provided from the control unit 11.

The source driver 13 is a circuit which provides a pixel signal Vpix to each pixel Pix (subpixel SPix), which will be described later (FIG. 4), of the display device with a touch detection function 10, based on a control signal provided from the control unit 11. The source driver 13 produces, from a video signal for one horizontal line, a pixel signal by time-division multiplexing pixel signals Vpix of a plurality of subpixels SPix of the liquid crystal display device 20. The source driver 13 then provides the produced pixel signal to the source selector unit 14.

Figure 3:
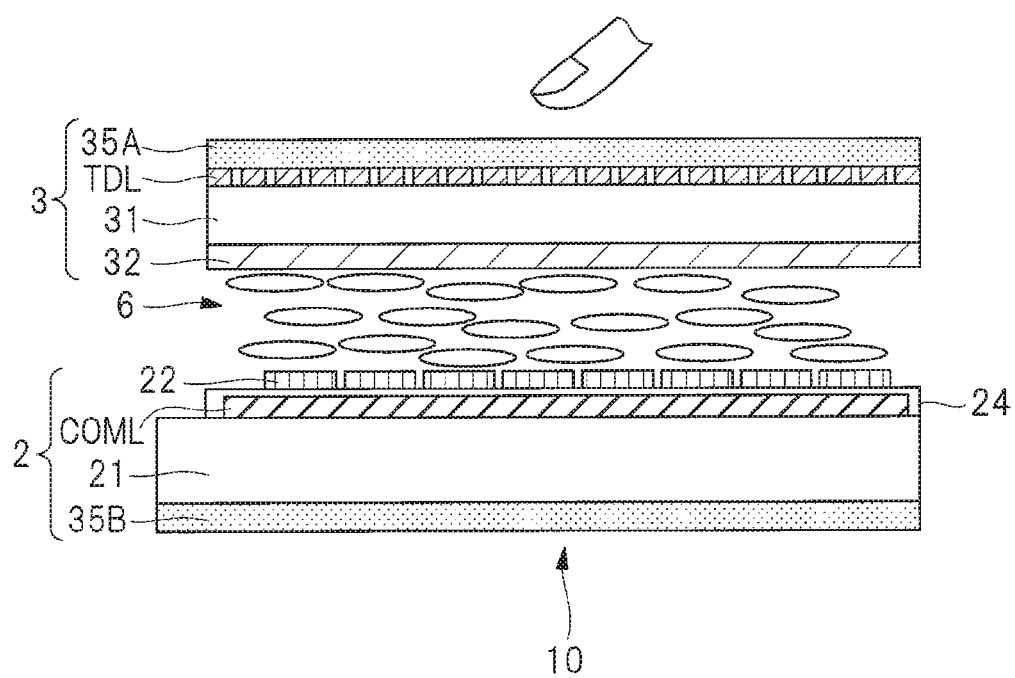
FIG. 3 is a sectional view showing an example of a schematic sectional structure of a display device with a touch detection function according to the first embodiment of the invention.

The source driver 13 also produces a switch control signal SLS which is necessary to demultiplex the multiplexed pixel signals Vpix into an image signal Vsig. The source driver 13 then provides the switch control signal SLS, in addition to the pixel signals Vpix, to the source selector unit 14. The source selector unit 14, by multiplexer drive, provides the pixel signal Vpix so as to perform writing sequentially for each subpixel SPix corresponding to each color of a color filter 32 described later (FIG. 3).

The drive electrode driver 15 is a circuit which provides a driving signal Vcom to a drive electrode COML, which will be described later (FIG. 2), of the display device with a touch detection function 10, based on a control signal provided from the control unit 11. The driving signal selector unit 16 selects the drive electrode COML to be provided with the driving signal Vcom, depending on a switch control signal SI0 produced by the drive electrode driver 15.

The touch detection device 30 is a device which operates based on a principle of capacitive type touch detection, and outputs a touch detection signal Vdet.

The touch detection device 30 provides to the drive electrode COML, the driving signal Vcom provided from the drive electrode driver 15 via the driving signal selector unit 16, as the driving signal Vcom for touch detection (hereinafter also referred to as a touch driving signal Vcom). The touch detection device 30, according to the touch driving signal Vcom, performs a touch detection by scanning detection blocks one by one sequentially.

The touch detection device 30 outputs, from a plurality of touch detection electrodes TDL described later (FIG. 6), the touch detection signal Vdet for each detection block. The touch detection device 30 then provides the touch detection signal Vdet to the touch detection section 40.

The touch detection section 40 is a circuit which detects the presence/absence of a touch (a contact state) on the touch detection device 30, based on the control signal provided from the control unit 11, and on the touch detection signal Vdet provided from the touch detection device 30 of the display device with a touch detection function 10. When a touch is detected, the touch detection section 40 finds the coordinates and the like of the touch in a touch detection region. The touch detection section 40 includes an analog low pass filter (LPF) unit 42, an analog-to-digital (A/D) conversion unit 43, a signal processing unit 44, a coordinate extraction unit 45, and a detection timing control unit 46.

The analog LPF unit 42 is an analog low pass filter to which the touch detection signal Vdet provided from the touch detection device 30 is input. The analog LPF unit 42 removes a high frequency component (a noise component) contained in the touch detection signal Vdet, to obtain a touch component. The analog LPF unit 42 then outputs each touch component. A resistance R for applying a direct current potential (0 V) is connected between each input terminal of the analog LPF unit 42 and a ground. Alternatively, for example, a switch may be provided instead of the resistance R, so that a direct current potential (0 V) can be applied by switching the switch on at a specific time.

The A/D conversion unit 43 is a circuit which samples an analog signal output from the analog LPF unit 42 at the timing synchronized with the driving signal Vcom, and converts the analog signal to a digital signal.

The signal processing unit 44 includes a digital filter. The digital filter removes a frequency component (a noise component) which is contained in an output signal of the A/D conversion unit 43, and is higher than the frequency at which the touch driving signal Vcom is sampled, thereby obtaining a touch component. The signal processing unit 44 is a logic circuit which detects the presence/absence of a touch on the touch detection device 30, based on the output signal of the A/D conversion unit 43.

The coordinate extraction unit 45 is a logic circuit which finds touch panel coordinates of a touch, when the touch is detected by the signal processing unit 44. The detection timing control unit 46 controls the A/D conversion unit 43, the signal processing unit 44, and the coordinate extraction unit 45, in such a manner that the above units 43 to 45 operate synchronously with each other. The coordinate extraction unit 45 outputs the touch panel coordinates as signal output Vout.

<Module>

Figure 2:
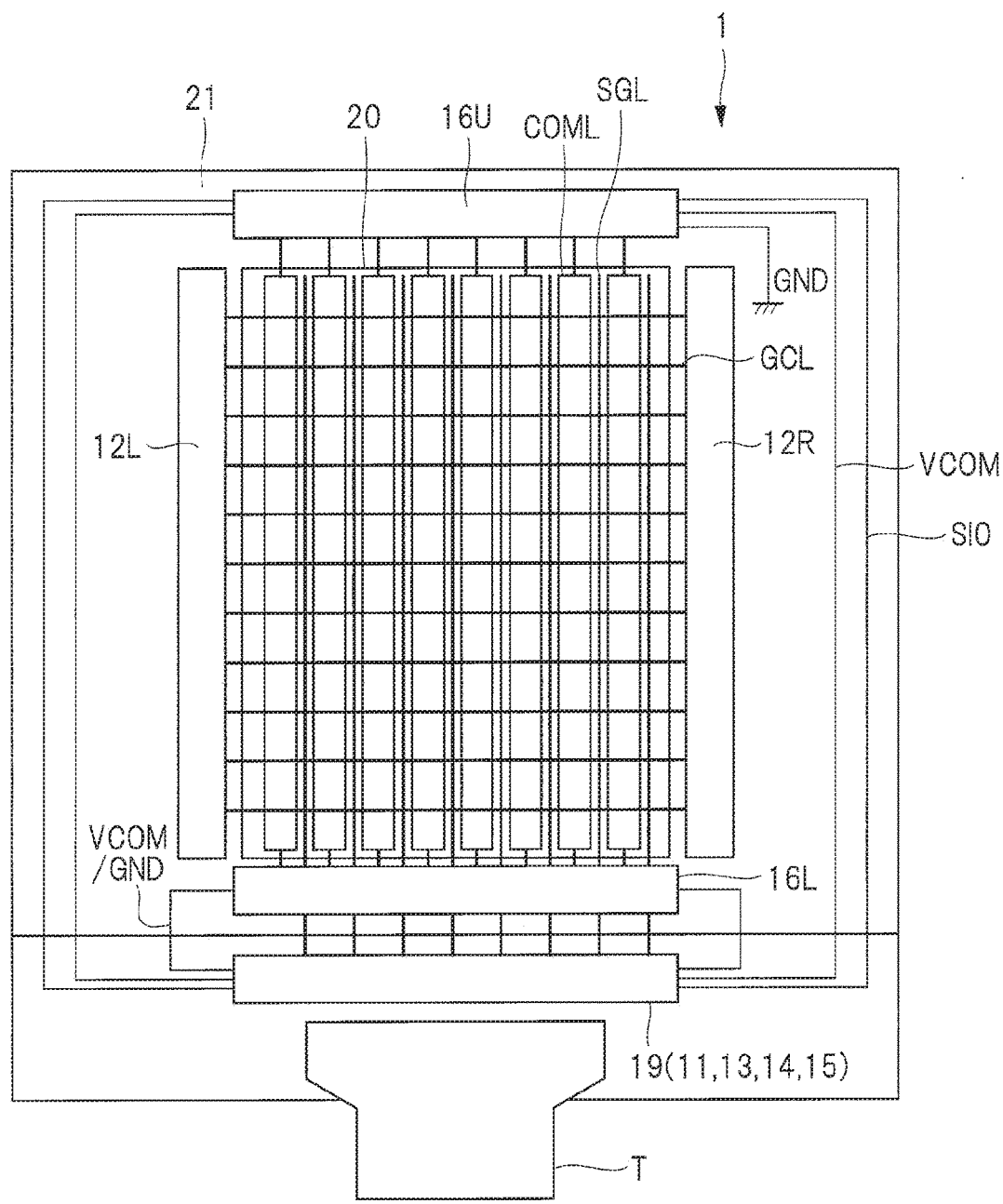
FIG. 2 is a diagram showing an example of a module on which a display with a touch detection function, according to the first embodiment of the invention, is mounted.

FIG. 2 is a diagram showing an example of a module on which the display with a touch detection function, according to the present embodiment, is mounted.

As shown in FIG. 2, the display with a touch detection function 1 includes the liquid crystal display device 20, the gate driver 12 (12L, 12R), the driving signal selector unit 16 (16U, 16L), and a chip-on-glass (COG) 19. The COG 19 includes the control unit 11, the source driver 13, the source selector unit 14, and the drive electrode driver 15, which are shown in FIG. 1.

The gate drivers 12L, 12R, and the driving signal selector unit 16U, 16L are formed on a thin-film transistor (TFT) substrate 21 that is a glass substrate. The gate drivers 12L and 12R are formed on the right and left sides (on the long side) of the TFT substrate 21 when seen in a plan view, with the liquid crystal display device 20 interposed therebetween. The gate drivers 12L is formed on the left side, and the gate driver 12R is formed on the right side. The driving signal selector units 16U and 16L are formed on the upper and lower sides (on the short side) of the TFT substrate 21 when seen in a plan view, with the liquid crystal display device 20 interposed therebetween. The driving signal selector unit 16U is formed on the upper side, and the driving signal selector 16L is formed on the lower side.

The COG 19 is a chip mounted on the TFT substrate 21, and has respective circuits necessary for a display operation, such as the control unit 11, and the source driver 13 which are shown in FIG. 1, built-in. The COG 19 is also called a driver integrated circuit (IC). Apart of the TFT substrate 21 on which the COG 19 is mounted is also called a panel. In the display with a touch detection function 1, the COG 19 may also have a circuit such as the gate driver 12 built-in.

In the TFT substrate 21, a wiring line for the switch control signal SI0 is formed between the drive electrode driver 15 in the COG 19, and the driving signal selector units 16U and 16L. Further, a driving signal wiring line VCOM is formed between the drive electrode driver 15 and the driving signal selector unit 16U, and a drive changeover wiring line VCOM/GND is formed between the drive electrode driver 15 and the driving signal selector unit 16L. Also on the TFT substrate 21, there is formed a ground wiring line GND which is connected to the driving signal selector unit 16U.

The drive electrode COML, and a scanning signal line GCL are schematically shown in the liquid crystal display device 20 of the display with a touch detection function 1, in a direction perpendicular to a surface of the TFT substrate 21 (i.e. when seen in a plan view). The scanning signal line GCL is formed in such a way as to cross over the drive electrode COML. Further, the drive electrode COML, and a pixel signal line SGL are schematically shown in the liquid crystal display device 20, in the direction perpendicular to the surface of the TFT substrate 21. The pixel signal line SGL is formed in such a way as to extend in a direction parallel to the drive electrode COML, without crossing the drive electrode COML.

The drive electrodes COML are formed, extending in the long side direction (in a lengthwise direction) of the liquid crystal display device 20 and in parallel in the short side direction (in a crosswise direction) of the liquid crystal display device 20. The touch detection electrodes TDL described later (FIG. 6) are formed, extending in the short side direction of the display device with a touch detection function 10 and in parallel in the long side direction of the display device with a touch detection function 10. An output of the touch detection electrode TDL is provided on the short side of the liquid crystal display device 20, and connected to the touch detection section 40 (see FIG. 1) mounted externally to the module, via a terminal unit T including a flexible substrate, etc.

<Display Device with Touch Detection Function>

Figure 4:
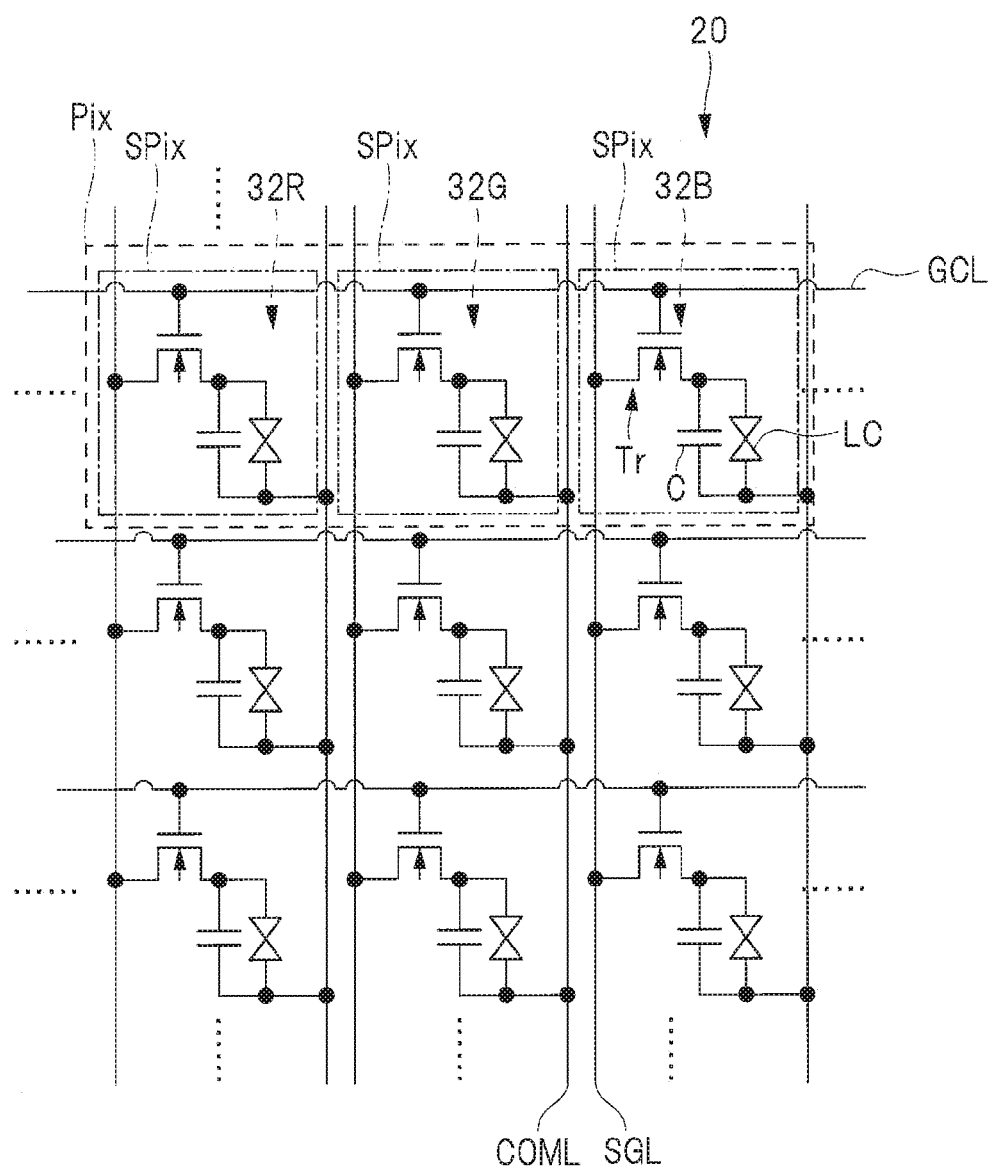
FIG. 4 is a circuit diagram showing an example of a pixel array in a liquid crystal display device according to the first embodiment of the invention.

The following is a detailed description of a configuration example of the above-described display device with a touch detection function 10. FIG. 3 is a sectional view showing an example of a schematic sectional structure of the display device with a touch detection function 10, according to the present embodiment. FIG. 4 is a circuit diagram showing an example of a pixel array in the liquid crystal display device 20 according to the present embodiment.

As shown in FIG. 3, the display device with a touch detection function 10 includes a pixel substrate 2, an opposing substrate 3 placed in such a way as to be opposed to the pixel substrate 2 in a direction perpendicular to a surface of the pixel substrate 2, and a liquid crystal layer 6 interposed between the pixel substrate 2 and the opposing substrate 3.

The liquid crystal layer 6, being formed of a plurality of liquid crystal molecules, modulates light which passes through the layer, depending on the state of an electric field. Additionally, an alignment film may be provided between the liquid crystal layer 6 and the pixel substrate 2, and also between the liquid crystal layer 6 and the opposing substrate 3, which are shown in FIG. 3.

The opposing substrate 3 includes a glass substrate 31, and a color filter 32 formed on one surface (the liquid crystal layer 6 side) of the glass substrate 31. The touch detection electrode TDL which is a detection electrode of the touch detection device 30 is formed on the other surface of the glass substrate 31. Further, a polarizer 35A is provided on the touch detection electrode TDL.

The pixel substrate 2 includes a TFT substrate 21 as a circuit substrate, a plurality of pixel electrodes 22 provided in a matrix on the TFT substrate 21 (on the liquid crystal layer 6 side), a plurality of drive electrodes COML formed between the TFT substrate 21 and the pixel electrode 22, an insulation layer 24 which insulates the pixel electrode 22 and the drive electrode COML from each other, and an incident side polarizer 35B provided on the undersurface side of the TFT substrate 21.

In the present embodiment, a fringe field switching (FFS) mode is adopted. In the FFS mode, a fringe field is generated between the pixel electrode 22 and the drive electrode COML, thereby rotating the liquid crystal molecules. However, another type of horizontal electric field mode such as an in-plane switching (IPS) mode can also be adopted.

The pixel electrode 22 and the drive electrode COML are each formed of a permeable conductive film of indium tin oxide (ITO), for example.

On the TFT substrate 21, there is formed a wiring line including a thin film transistor (TFT) element Tr of each subpixel SPix, the pixel signal line SGL, and the scanning signal line GCL, which are shown in FIG. 4. The pixel signal line SGL provides the pixel signal Vpix to each pixel electrode 22, and the scanning signal line GCL drives each TFT element Tr. The liquid crystal display device 20 shown in FIG. 4 has a plurality of subpixels SPix arrayed in a matrix. The subpixel SPix includes the TFT element Tr, a liquid crystal element LC, and a storage capacitor C. The TFT element Tr is formed of a thin film transistor. In this example, the TFT element Tr is formed of a TFT having an n-channel metal oxide semiconductor (MOS) type. A source of the TFT element Tr is connected to the pixel signal line SGL, a gate of the TFT element Tr is connected to the scanning signal line GCL, and a drain of the TFT element Tr is connected to one end of the liquid crystal element LC. The liquid crystal element LC is connected to the drain of the TFT element Tr at one end, and to the drive electrode COML at the other end. The liquid crystal element LC is a display function layer which exerts an image display function, based on the pixel signal Vpix. The storage capacitor C is connected to the drain of the TFT element Tr at one end, and to the drive electrode COML at the other end.

The subpixels SPix belonging to the same row of the liquid crystal display device 20 are connected to each other by the scanning signal line GCL. The scanning signal line GCL is connected to the gate driver 12, so that the scanning signal Vscan is provided from the gate driver 12. Also, the subpixels SPix belonging to the same column of the liquid crystal display device 20 are connected to each other by the pixel signal line SGL. The pixel signal line SGL is connected to the source driver 13, so that the pixel signal Vpix is provided from the source driver 13. Further, the subpixels SPix belonging to the same column of the liquid crystal display device 20 are connected to each other by the drive electrode COML. The drive electrode COML is connected to the drive electrode driver 15, so that the driving signal Vcom is provided from the drive electrode driver 15. In other words, in this example, a plurality of the subpixels SPix belonging to the same single column share one drive electrode COML.

The gate driver 12 shown in FIG. 1 applies the scanning signal Vscan to the gate of the TFT element Tr of the subpixel SPix, via the scanning signal line GCL shown in FIG. 4. The gate driver 12 thereby selects sequentially one row (one horizontal line) of the subpixels SPix as an object to be driven for display, from among the subpixels SPix formed in a matrix on the liquid crystal display device 20. The source driver 13 shown in FIG. 1 provides the pixel signal Vpix, via the pixel signal line SGL shown in FIG. 4, to each subpixel SPix forming one horizontal line selected sequentially by the gate driver 12. As a result, one horizontal line of each subpixel SPix is displayed, depending on the pixel signal Vpix to be provided. The drive electrode driver 15 shown in FIG. 1 drives the drive electrode COML shown in FIGS. 3 and 4, by applying the driving signal Vcom to the electrode.

As described above, in the liquid crystal display device 20, the gate driver 12 drives the scanning signal line GCL so that a line sequential scanning is performed in a time sharing manner, thereby one horizontal line is selected sequentially. Also, in the liquid crystal display device 20, the source driver 13 provides the pixel signal Vpix to the subpixels SPix belonging to one horizontal line, so that the horizontal lines are displayed one at a time. In such display operation, the drive electrode driver 15 applies the driving signal Vcom for display to the drive electrode COML corresponding to the one horizontal line. Thus, the drive electrode COML functions as a common drive electrode (a common electrode) of the liquid crystal display device 20, and functions as a drive electrode of the touch detection device 30 as well. In the following description, the driving signal Vcom as a display driving signal is also referred to as a display driving signal Vcom, and the driving signal Vcom as a touch driving signal is also referred to as a touch driving signal Vcom.

The color filter 32 shown in FIG. 3 is colored in, for example, three colors: red (R), green (G), and blue (B). In the color filter 32, color regions of red (R), green (G), and blue (B) are periodically arrayed, in such a manner that each of the color regions of red (R) 32R, green (G) 32G, and blue (B) 32B corresponds to each of the above-mentioned subpixels SPix shown in FIG. 4. A set of the subpixels SPix corresponding to the color regions of the three colors 32R, 32G, and 32B makes a pixel Pix. The subpixel Spix can, therefore, display a single color. The color filter 32 is opposed to the liquid crystal layer 6 in a direction perpendicular to the TFT substrate 21. Other color combinations are applicable to the color filter 32, provided that the color filter 32 is colored in different colors. The color filter 32 can be omitted. In other words, there may be a region where the color filter does not exist, that is, a transparent subpixel.

Figure 5:
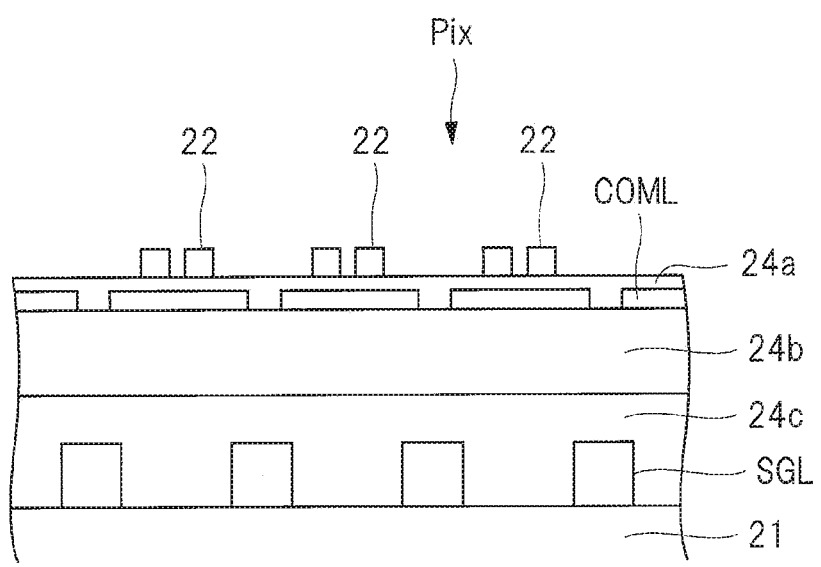
FIG. 5 is an explanatory diagram for illustrating a relation between a drive electrode, a pixel signal line, and a pixel electrode, in a module on which a display with a touch detection function, according to the first embodiment of the invention, is mounted.

The drive electrode COML according to the present embodiment functions as the drive electrode of the touch detection device 30, as well as functioning as the drive electrode of the liquid crystal display device 20. FIG. 5 is an explanatory diagram (a sectional view) for illustrating a relation between the drive electrode, the pixel signal line, and the pixel electrode, in a module on which the display with a touch detection function, according to the present embodiment, is mounted.

As shown in FIG. 5, the drive electrode COML is opposed to the pixel electrode 22, in a direction perpendicular to a surface of the TFT substrate 21. As shown in FIG. 5, one drive electrode COML is placed in such away as to correspond to one pixel electrode 22 (a pixel electrode 22 forming one column). The insulation layers 24a, 24b and 24c insulate the pixel electrode 22 and the drive electrode COML from each other, and also insulate the pixel electrode 22 and the pixel signal line SGL formed on the surface of the TFT substrate 21 from each other. The drive electrode COML extends parallel to a direction in which the pixel signal line SGL extends. The drive electrode COML may extend in a direction different from the aforementioned direction in which the pixel signal line SGL extends, provided that the drive electrode COML is divided in such a way as to have a width covering one or more pixels (subpixels) when seen in a plan view, in a direction at a right angle to a direction in which the pixel signal line SGL extends, that is, in a direction in which the scanning signal line GCL extends.

Figure 6:
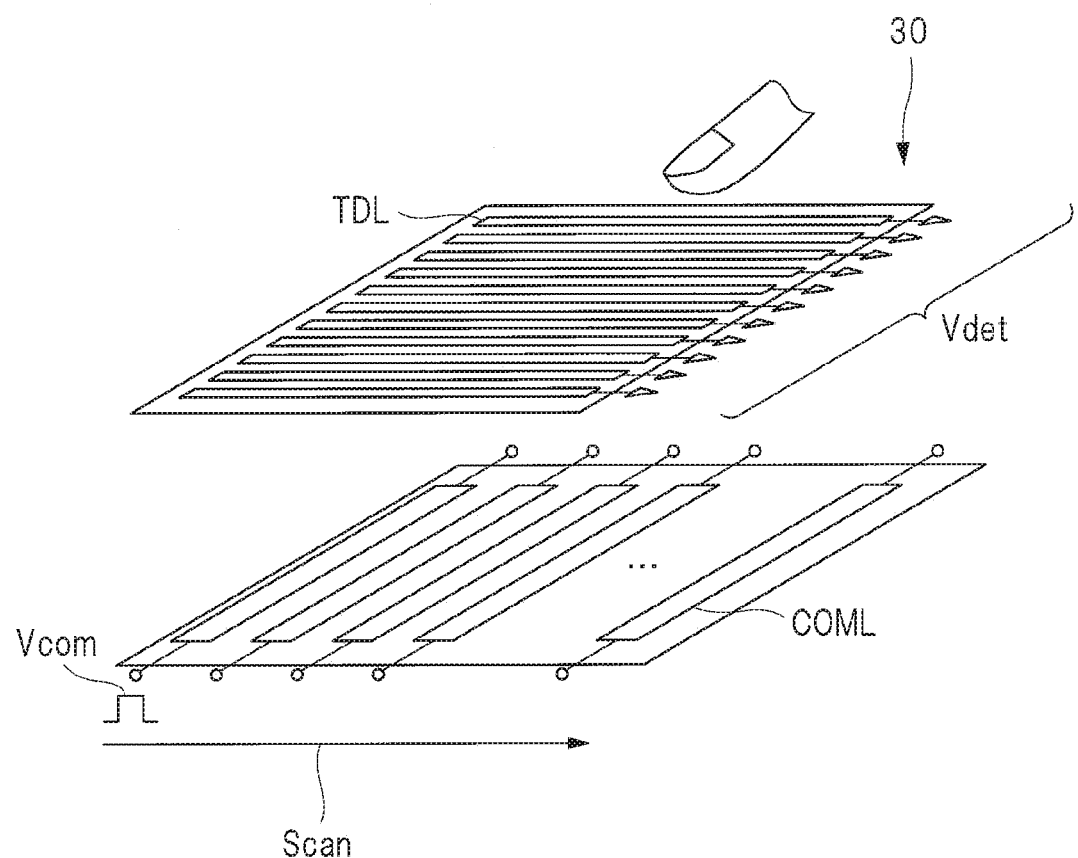
FIG. 6 is a perspective view showing an example of a configuration of a drive electrode and a touch detection electrode, of a touch detection device according to the first embodiment of the invention.
Figure 7:
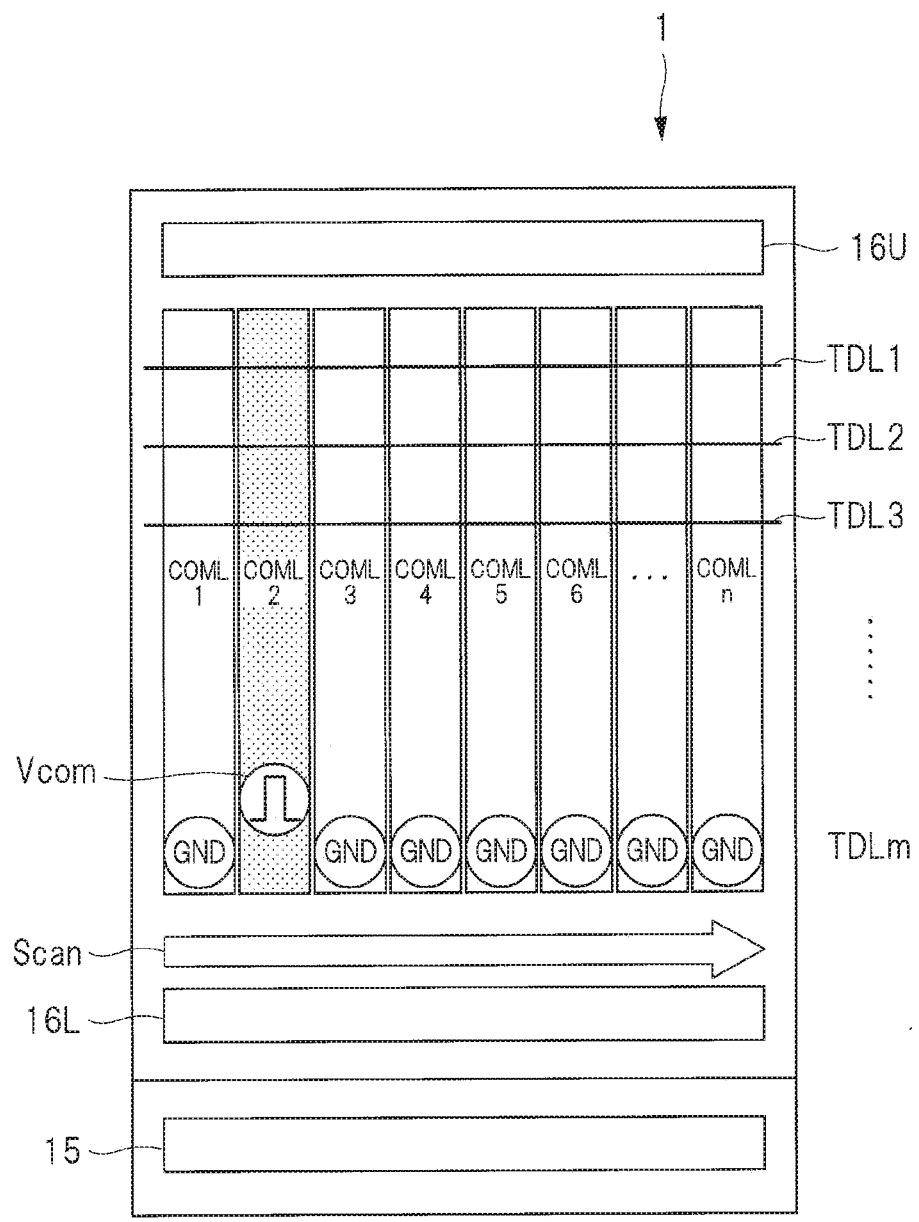
FIG. 7 is an explanatory diagram for illustrating an example of an operation of the drive electrode driver according to the first embodiment of the invention.

FIG. 6 is a perspective view showing an example of a configuration of the drive electrode and the touch detection electrode, of a touch detection device 30 according to the present embodiment. FIG. 7 is an explanatory diagram for illustrating an example of an operation of the drive electrode driver according to the present embodiment.

As shown in FIG. 6, the touch detection device 30 includes the touch detection electrode TDL provided in the opposing substrate 3, and the drive electrode COML provided in the pixel substrate 2. The drive electrode COML is divided into a plurality of stripe shaped electrode patterns extending in one direction. The drive electrode COML is not necessarily divided into stripes. For example, the drive electrode COML may have a comb teeth shape. The drive electrode COML needs at least to be divided into multiple segments. A slit dividing the drive electrode COML may be linear or curved. The drive electrode COML may also be divided in such a way as to have the same width as the subpixel Spix displayed by the pixel electrode corresponding to a selected signal line, the width in a direction at a right angle to a direction in which the pixel signal line SGL extends.

In a touch detection operation, the drive electrode driver 15 provides the driving signal Vcom sequentially to each of the electrode patterns of the drive electrode COML, so that a line sequential scanning is performed in a time sharing manner. The touch detection electrode TDL is configured of stripe shaped electrode patterns extending in such a way as to cross the extending direction of the electrode patterns of the drive electrode COML. The touch detection electrode TDL is opposed to the drive electrode COML in a direction perpendicular to the surface of the TFT substrate 21. Each of the electrode patterns of the touch detection electrode TDL is connected to an input of the analog LPF unit 42 in the touch detection section 40 (see FIG. 1). Capacitance is generated in a crossing part where the drive electrode COML and the touch detection electrode TDL cross each other.

With this configuration, in the touch detection device 30 during the touch detection operation, the drive electrode driver 15 shown in FIG. 1 performs driving so that a line sequential scanning is performed in a time sharing manner. As shown in FIG. 7, the drive electrode driver 15 provides the driving signal Vcom to only the selected drive electrode COML2, for example, while not providing the driving signal Vcom to the unselected drive electrodes COML1 and COML3 to COMLn. The unselected drive electrodes COML1, and COML3 to COMLn are at the GND potential. As a result, one detection block (the touch detection electrodes TDL1 to TDLm) of the drive electrode COML is selected sequentially in a scanning direction Scan, so that the touch detection device 30 outputs the touch detection signal Vdet from the touch detection electrode TDL.

For example, the drive electrode COML described above is divided into multiple segments so that scanning can be performed in a direction different from the direction in which the pixel signal line SGL extends. The scanning direction Scan, therefore, is different from the direction in which the pixel signal line SGL extends. As described above, in the touch detection device 30, touch is detected by the detection block. The electrode patterns crossing over each other, as shown in FIG. 6, form capacitive touch sensors in a matrix. This makes it possible to detect a position in which an external proximity object has contacted or approached by scanning the entire touch detection surface of the touch detection device 30.

<Drive Electrode and Drive Circuit Thereof>

Figure 8:
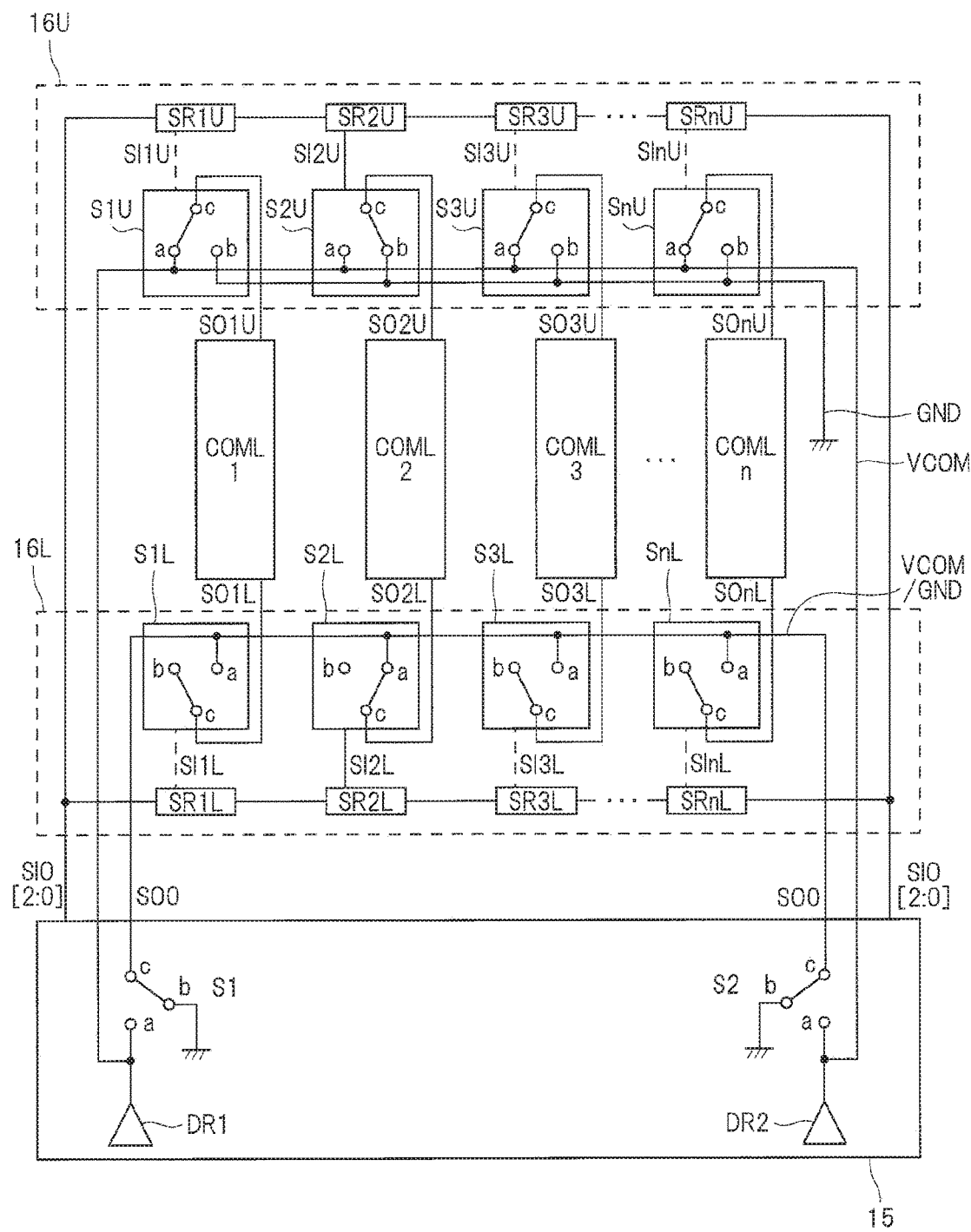
FIG. 8 is an explanatory diagram showing an example of a configuration of the drive electrode and a drive circuit thereof, according to the first embodiment of the invention.
Figure 9:
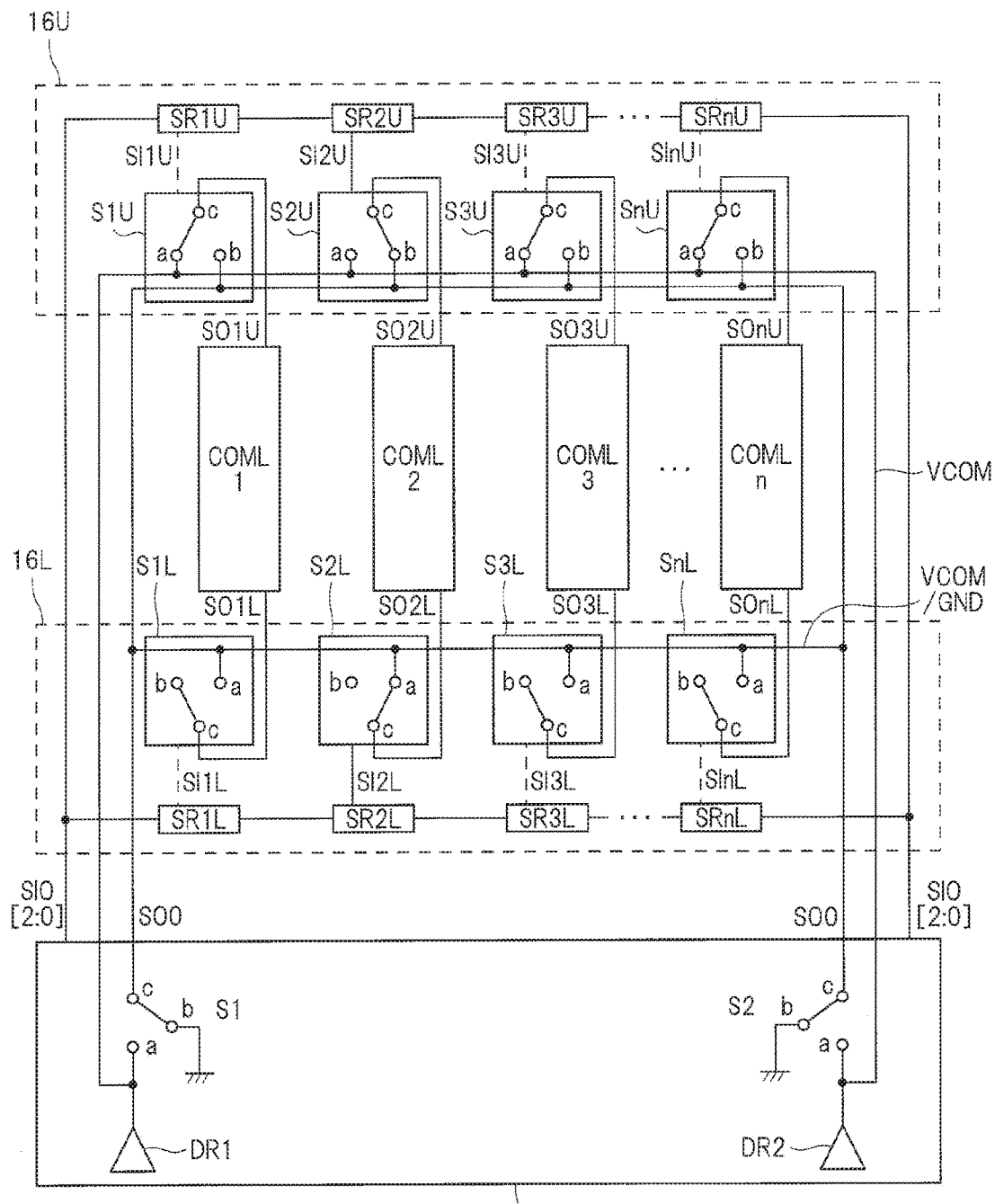
FIG. 9 is an explanatory diagram showing an example of a configuration of a drive electrode and a drive circuit thereof, according to a comparative example with respect to the first embodiment of the invention.

The drive electrode and its drive circuit of the display with a touch detection function according to the present embodiment will be described below, with reference to FIG. 8. FIG. 8 is an explanatory diagram showing an example of a configuration of the drive electrode and the drive circuit thereof, according to the present embodiment. To give a clear description of a feature of the drive electrode and the drive circuit thereof according to the present embodiment, the drive electrode and drive circuit are described here, by comparing them with a drive electrode and a drive circuit thereof according to a comparative example with respect to the present embodiment. FIG. 9 is an explanatory diagram showing the example of the configuration of the drive electrode and the drive circuit thereof, according to the comparative example with respect to the present embodiment.

As shown in FIG. 8, in the drive electrode and the drive circuit thereof according to the present embodiment, the drive electrode COML (COML1 to COMLn) is formed, extending in the long side direction (the up/down direction in FIG. 8) of the display device with a touch detection function 10, as described above. The drive circuit which drives the drive electrodes COML1 to COMLn includes the drive electrode driver 15 and the driving signal selector unit 16 (16U, 16L) described above. The driving signal selector units 16U and 16L are provided in such a way as to be opposed to one end, and the other end, respectively, of the drive electrode COML, in the extending direction of the drive electrode COML. The driving signal selector unit 16L is placed between the other end of the drive electrode COML and the drive electrode driver 15. In other words, in FIG. 8, the driving signal selector units 16U and 16L are placed on the upper and lower sides, respectively, of the display device with a touch detection function 10. The drive electrode driver 15 is placed lower than the driving signal selector unit 16L placed on the lower side of the display device 10. The driving signal selector unit 16U and 16L are formed on the TFT substrate 21 which is a glass or a transparent resin substrate. The drive electrode driver 15 is included in the COG 19 which is a chip mounted on the TFT substrate 21.

Each driving signal selector unit 16U, 16L includes a switch S and a shift register SR. The number of the switch S and shift register SR each is the same as the segment number of the drive electrode COML. In this example, when the segment number of the drive electrode COML is "n" (i.e., from 1 to n), each of the driving signal selector unit 16U and 16L includes n pieces of the switches S1 to Sn (S1U to SnU, S1L to SnL) and n pieces of the shift registers SR1 to SRn (SR1U to SRnU, SR1L to SRnL) corresponding to n pieces of the drive electrodes COML1 to COMLn. Each of the switches S1U to SnU and S1L to SnL is a changeover switch having a common terminal c, a first terminal a, and a second terminal b. Each of the shift registers SR1U to SRnU and SR1L to SRnL is a register which switches on and off the corresponding switch (S1U to SnU, S1L to SnL), based on the data stored in the shift register. For example, when the data stored in the shift register is "1" (the high level voltage), the shift register switches on the switch. When the data stored in the shift register is "0" (the low level voltage), the shift register switches off the switch. The shift registers SR1U to SRnU and SR1L to SRnL are controlled by the switch control signal SI0 [2:0] provided from the drive electrode driver 15.

In the driving signal selector unit 16U placed on the upper side of the display device 10, the common terminal c of the switches S1U to SnU is connected to each of the drive electrodes COML1 to COMLn. The first terminal a of the switches S1U to SnU is connected to the driving signal wiring line VCOM. The second terminal b of the switches S1U to SnU is connected to the ground wiring line GND. The switches S1U to SnU are switched on and off by input signals SI1U to SInU provided from the shift registers SR1U to SRnU. Output signals SO1U to SOnU from the switches S1U to SnU are respectively provided to the drive electrodes COML1 to COMLn.

In the driving signal selector unit 16L placed on the lower side of the display device 10, the common terminal c of the switches S1L to SnL is connected to each of the drive electrodes COML1 to COMLn. The first terminal a of the switches S1L to SnL is connected to the drive changeover wiring line VCOM/GND. The second terminal b of the switches S1L to SnL is unconnected in a high impedance state. The switches S1L to SnL are switched on and off by input signals SI1L to SInL provided from the shift registers SR1L to SRnL. Output signals SO1L to SOnL from the switches S1L to SnL are provided to the drive electrodes COML1 to COMLn.

The drive electrode driver 15 includes two drivers DR1 and DR2. An output of each of the drivers DR1, DR2 is respectively connected to switches S1, S2. Each of the switches S1 and S2 is a changeover switch having a common terminal c, a first terminal a, and a second terminal b. The common terminal c of the switches S1 and S2 is connected to the drive changeover wiring line VCOM/GND. The first terminal a of the switches S1 and S2 is connected to the output of the drivers DR1 and DR2, and also to the driving signal wiring line VCOM. The second terminal b of the switches S1 and S2 is connected to the ground potential.

In the present embodiment, a wiring line for the switch control signal SI0 is formed between the drive electrode driver 15 and each of the driving signal selector units 16U and 16L, in the TFT substrate 21 of the display device with a touch detection function 10. Further, the driving signal wiring line VCOM is formed between the drive electrode driver 15 and the driving signal selector unit 16U. Also, the drive changeover wiring line VCOM/GND is formed between the drive electrode driver 15 and the driving signal selector unit 16L. The ground wiring line GND which is connected to the driving signal selector unit 16U is also formed in the TFT substrate 21.

The configuration of the drive electrode COML and the drive circuit thereof (the drive electrode driver 15, and the driving signal selector units 16U and 16L) of the present embodiment has been described above. The present embodiment is characteristic particularly in that the ground wiring line GND is provided on the panel on which the drive electrodes COML1 to COMLn are placed, and the ground wiring line GND is connected to the second terminal b of the switches S1U to SnU in the driving signal selector unit 16U placed on the upper side of the display device 10.

For comparison, in the configuration of the drive electrode and the drive circuit thereof, according to the comparative example with respect to the present embodiment, as shown in FIG. 9, the second terminal b of the switches S1U to SnU in the driving signal selector unit 16U placed on the upper side is connected to the drive changeover wiring line VCOM/GND. The first terminal a of the switches S1L to SnL in the driving signal selector unit 16L placed on the lower side is also connected to the drive changeover wiring line VCOM/GND.

In the configuration of the comparative example shown in FIG. 9, when the drive electrode COML2, for example, is selected in the touch detection period, as shown in FIG. 9, the selected drive electrode COML2 is connected to the ground potential via the switch S2U in the driving signal selector unit 16U placed on the upper side, through the drive changeover wiring line VCOM/GND, and then via the switches S1 and S2 in the drive electrode driver 15. Likewise, the selected drive electrode COML2 is connected to the ground potential via the switch S2L in the driving signal selector unit 16L placed on the lower side, through the drive changeover wiring line VCOM/GND, and then via the switches S1 and S2 in the drive electrode driver 15. In this case, a current flowing to the ground potential flows through the switches S1 and S2 in the drive electrode driver 15, which results in undesirable poor convergence toward the ground potential.

In other words, in the configuration of the comparative example, when the driving signal is switched to the GND potential (ground potential) at the time of touch detection, total current flows through the switches S1 and S2 inside the drive electrode driver 15. This causes a problem because the convergence of potential fluctuation toward the GND potential is poor, unless the switches S1 and S2 on the drive electrode driver 15 are large enough such that the switch resistance is sufficiently low.

In view of the above, in the present embodiment, the convergence of potential fluctuation toward the GND potential is improved, while the switches S1 and S2 on the drive electrode driver 15 side are kept small. To achieve the above objective, the ground wiring line GND is provided on the panel side of the display device with a touch detection function 10, and the ground wiring line GND is connected to the second terminal b of the switches S1U to SnU in the driving signal selector unit 16U placed on the upper side of the display device 10. Then, the problem in the comparative example is solved by controlling the switches S1U to SnU in the driving signal selector unit 16U, and the switches S1L to SnL in the driving signal selector unit 16L, in such a manner that the switches S1U to SnU, and S1L to SnL are switched on and off at the same timing as the drive changeover timing by the drive electrode driver 15.

The state of the drive electrode driver 15, the driving signal selector unit 16U placed on the upper side, and the driving signal selector unit 16L placed on the lower side, in the configuration of the drive electrode and the drive circuit thereof according to the present embodiment shown in FIG. 8, corresponds to the state shown in FIG. 12 to be discussed later.

<Operation of Drive Circuit of Drive Electrode>

Figure 10:
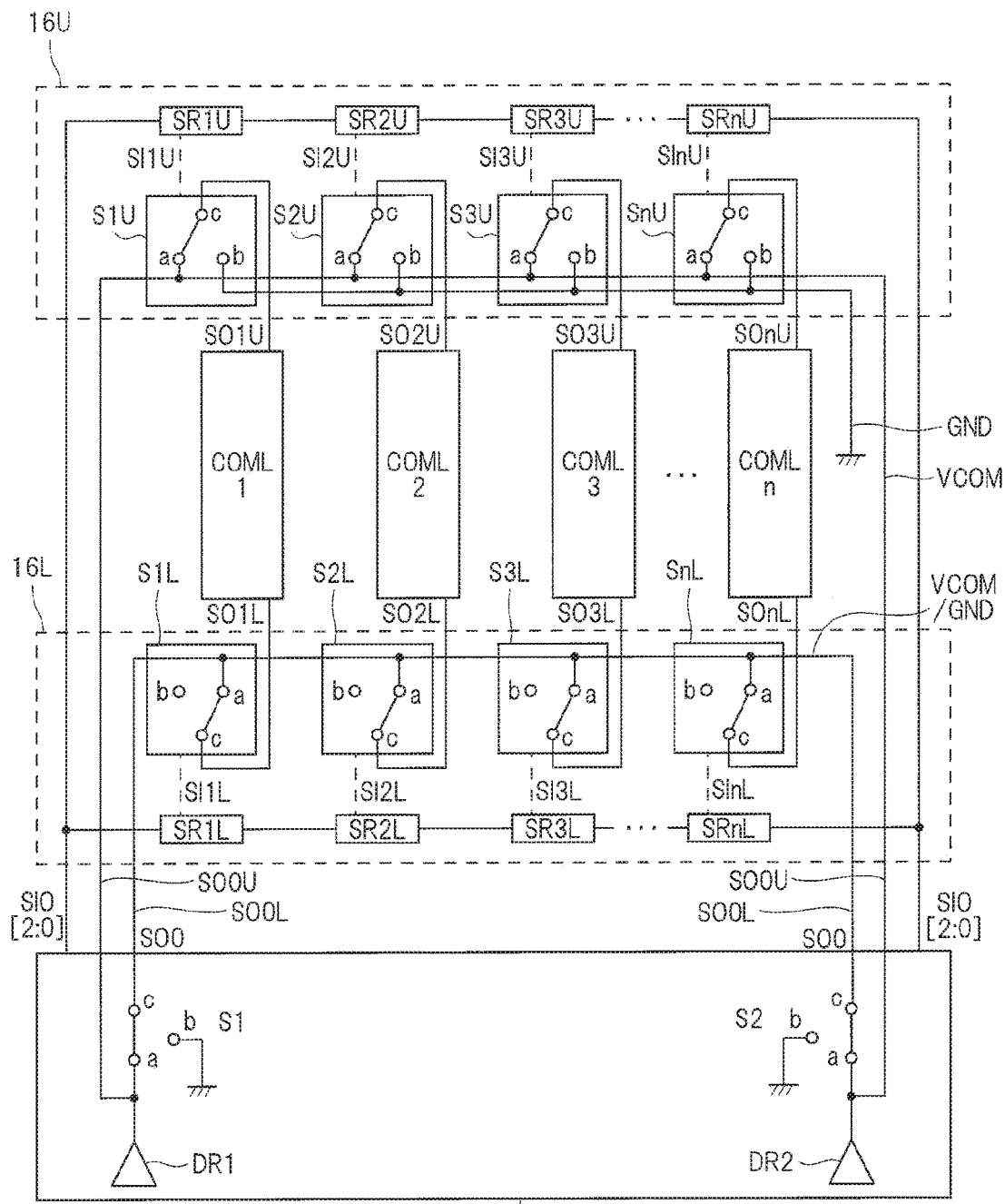
FIG. 10 is an explanatory diagram showing an example of an operation (display period) of the drive circuit of the drive electrode according to the first embodiment of the invention.
Figure 11:
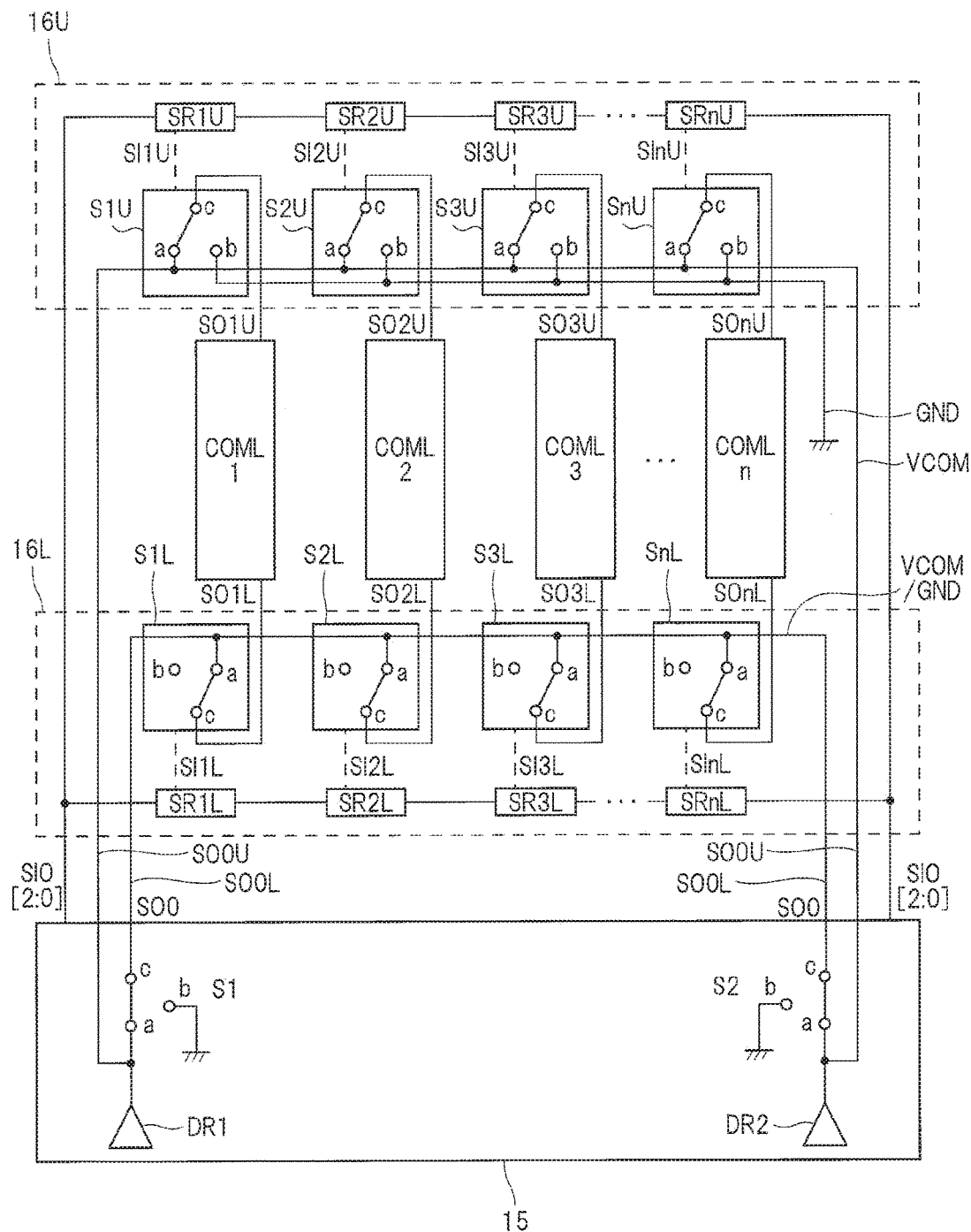
FIG. 11 is an explanatory diagram showing an example of an operation (touch detection period (state (1))) of the drive circuit of the drive electrode according to the first embodiment of the invention.

An operation of the drive circuit of the drive electrode according to the present embodiment will be described below, with reference to FIGS. 10 to 14. FIGS. 10 to 12 are explanatory diagrams showing an example of the operation of the drive circuit of the drive electrode according to the present embodiment. FIGS. 13 and 14 are timing charts showing an example of the operation of the drive circuit of the drive electrode according to the present embodiment. FIG. 13 shows display periods 1 and 2, and touch detection periods 1 and 2. FIG. 14 shows subsequent display periods 3 to n, and subsequent touch detection periods 3 to n. The operation is conducted in the following order: the display period 1, the touch detection period 1, the display period 2, the touch detection period 2, the display period 3, the touch detection period 3, . . . , the display period n, and the touch detection period n. Each of the touch detection periods 1 to n includes a state (1), a state (2) following the state (1), and the state (1) following the state (2).

In FIGS. 10 to 14, the switch control signal is denoted by SI0 [2:0]. A start pulse signal to start the operation is denoted by SI0 [0], a clock signal to synchronize the operations is denoted by SI0 [1], and a switch changeover signal to switch between the display operation and the touch detection operation is denoted by SI0 [2]. The switch control signal SI0 [2:0] is provided from the drive electrode driver 15 to the shift registers SR1U to SRnU and SR1L to SRnL of the driving signal selector units 16U and 16L. An output signal from a part connected to the common terminal c of the switches S1 and S2 in the drive electrode driver 15 is denoted by SO0. The output signal SO0 is a driving signal provided from the drivers DR1 and DR2 in the drive electrode driver 15 to the switches S1L to SnL of the driving signal selector unit 16L, via the switches S1 and S2, and then the wiring line SO0L. A driving signal to the switches S1U to SnU of the driving signal selector unit 16U is provided from the drivers DR1 and DR2 in the drive electrode driver 15 via wiring line SO0U.

An input signal to the switches S1U to SnU of the driving signal selector unit 16U placed on the upper side is denoted by SI1U to SInU. The input signals SI1U to SInU are provided from the shift registers SR1U to SRnU of the driving signal selector unit 16U to the switches S1U to SnU. An input signal to the switches S1L to SnL of the driving signal selector unit 16L placed on the lower side is denoted by SI1L to SInL. The input signals SI1L to SInL are provided from the shift registers SR1L to SRnL of the driving signal selector unit 16L to the switches S1L to SnL.

An output signal from the switches S1U to SnU of the driving signal selector unit 16U placed on the upper side is denoted by SO1U to SOnU. The output signals SO1U to SOnU are provided from the switches S1U to SnU of the driving signal selector unit 16U to the drive electrodes COML1 to COMLn. An output signal from the switches S1L to SnL of the driving signal selector unit 16L placed on the lower side is denoted by SO1L to SOnL. The output signals SO1L to SOnL are provided from the switches S1L to SnL of the driving signal selector unit 16L to the drive electrodes COML1 to COMLn. The drive electrode is denoted by COML1 to COMLn.

<<Display Period>>

FIG. 10 shows the state of the drive electrode driver 15 and the driving signal selector units 16U and 16L in the display period. The state shown in FIG. 10 corresponds to the display period 2 (i.e., a state in which the shift registers SR1U and SR1L are selected) in FIG. 13.

In the display periods 1 to n, as shown in FIGS. 13 and 14, one pulse signal with a high level voltage is provided, as a start pulse signal SI0 [0], from the drive electrode driver 15 to the shift registers SR1U to SRnU, and SR1L to SRnL of the driving signal selector units 16U and 16L, in, for example, the first display period 1. The one pulse signal is provided only in the first display period 1. In the subsequent display periods 2 to n, the start pulse signal SI0 [0] is a signal with a low level voltage.

Further, in the display periods 1 to n, the clock signal SI0 [1] and the switch changeover signal SI0 [2] are low level voltage signals. The signals SI0 [1] and SI0 [2] are also provided from the drive electrode driver 15 to the shift registers SR1U to SRnU, and SR1L to SRnL of the driving signal selector units 16U and 16L.

Also, in the display periods 1 to n, the output signal SO0 provided from the drivers DR1 and DR2 in the drive electrode driver 15 via the switches S1 and S2 is a driving signal of the Vcom potential. The Vcom potential is a negative potential for the ground potential GND (0 V). In the display periods 1 to n, the switches S1 and S2 in the drive electrode driver 15 are off, and the common terminal c is connected to the first terminal a. The output signal SO0 is provided to the first terminal a of the switches S1L to SnL of the driving signal selector unit 16L placed on the lower side, via the wiring line SO0L. Meanwhile, a driving signal that is the same as the output signal SO0 is provided from the drivers DR1 and DR2 in the drive electrode driver 15 to the first terminal a of the switches S1U to SnU of the driving signal selector unit 16U placed on the upper side, via the wiring line SO0U.

In the display periods 1 to n, the shift registers SR1U to SRnU, and SR1U to SRnU are selected by the start pulse signal SI0 [0] and the clock signal SI0 [1], while all the switches S1U to SnU, and S1L to SnL are switched off, because the output of the switch changeover signal SI0 [2] is an output at a low level.

In other words, when the output of the switch changeover signal SI0 [2] is an output at a low level, from among the input signals SI1U to SInU to the switches S1U to SnU of the driving signal selector unit 16U placed on the upper side and the input signals SI1L to SInL to the switches S1L to SnL of the driving signal selector unit 16L placed on the lower side, an input signal to the switches, corresponding to the shift registers SR1U to SRnU, SR1L to SRnL to be selected, turns into a high level input signal. In the meantime, however, all the switches S1U to SnU, and S1L to SnL are switched off.

When the switches S1U to SnU of the driving signal selector unit 16U placed on the upper side are off, the common terminal c of each switch S1U to SnU is connected to the first terminal a that is connected to the driving signal wiring line VCOM (the Vcom potential). When the switches S1L to SnL of the driving signal selector unit 16L placed on the lower side are off, the common terminal c of each switch S1L to SnL is connected to the first terminal a to which the Vcom potential (that is, the output signal SO0) is provided from the drivers DR1 and DR2 in the drive electrode driver 15, via the switches S1 and S2.

As a result, the Vcom potential is output as the output signals SO1U to SOnU from the switches S1U to SnU of the driving signal selector unit 16U placed on the upper side, and as the output signals SO1L to SOnL from the switches S1L to SnL of the driving signal selector unit 16L placed on the lower side. In this manner, the Vcom potential is applied to the drive electrodes COML1 to COMLn.

<<Touch Detection Period (State (1))>>

FIG. 11 shows the state of the drive electrode driver 15 and the driving signal selector units 16U and 16L in the touch detection period (state (1)). The state shown in FIG. 11 corresponds to the state (1) included in the touch detection period 2 (i.e., a state in which the shift registers SR2U and SR2L are selected) of FIG. 13.

In the touch detection periods 1 to n (state (1)), as shown in FIGS. 13 and 14, the start pulse signal SI0 [0] is a low level voltage signal, the clock signal SI0 [1] is a high level voltage signal, and the switch changeover signal SI0 [2] is a low level voltage signal. In the touch detection periods 1 to n (state (1)), the voltage of the clock signal SI0 [1] is switched to the high level voltage. The signals SI0 [0], SI0 [1], and SI0 [2] (SI0 [2:0]) are provided from the drive electrode driver 15 to the shift registers SR1U to SRnU, and SR1L to SRnL of the driving signal selector units 16U and 16L.

In the touch detection periods 1 to n (state (1)), the output signal SO0, provided from the drivers DR1 and DR2 in the drive electrode driver 15 via the switches S1 and S2, is the driving signal of the Vcom potential. In the touch detection periods 1 to n (state (1)), the switches S1 and S2 in the drive electrode driver 15 are off, and the common terminal c is connected to the first terminal a. The output signal SO0 is provided, via the wiring line SO0L, to the first terminal a of the switches S1L to SnL of the driving signal selector unit 16L placed on the lower side. Meanwhile, a driving signal that is the same as the output signal SO0 is provided from the drivers DR1 and DR2 in the drive electrode driver 15 to the first terminal a of the switches S1U to SnU of the driving signal selector unit 16U placed on the upper side, via the wiring line SO0U.

In the touch detection periods 1 to n (state (1)), by a clock operation of the clock signal SI0 [1], the shift registers SR1U to SRnU, and SR1L to SRnL to be selected are shifted in sequence. That is, the touch detection periods 1 to n (state (1)) are shifting periods in which the shift registers SR1U to SRnU, and SR1L to SRnL are shifted in sequence. More specifically, high level voltage data, which is stored in the shift registers SR1U to SRnU of the driving signal selector unit 16U placed on the upper side and stored in the shift registers SR1L to SRnL of the driving signal selector unit 16L placed on the lower side, is shifted in sequence. However, all the switches S1U to SnU, S1L to SnL are switched off, as in the case of the display periods 1 to n described above, because the output of the switch changeover signal SI0 [2] is an output at a low level.

In other words, when the output of the switch changeover signal SI0 [2] is an output at a low level, from among the input signals SI1U to SInU to the switches S1U to SnU of the driving signal selector unit 16U placed on the upper side and the input signals SI1L to SInL to the switches S1L to SnL of the driving signal selector unit 16L placed on the lower side, an input signal to the switches, corresponding to the shift registers SR1U to SRnU and SR1L to SRnL to be selected, turns into a high level input signal. In the meantime, however, all the switches S1U to SnU, and S1L to SnL are switched off.

When the switches S1U to SnU of the driving signal selector unit 16U placed on the upper side are off, the common terminal c of each switch S1U to SnU is connected to the first terminal a which is connected to the driving signal wiring line VCOM (the Vcom potential). When the switches S1L to SnL of the driving signal selector unit 16L placed on the lower side are off, the common terminal c of each switch S1L to SnL is connected to the first terminal a to which the Vcom potential (that is, the output signal SO0) is provided from the drivers DR1 and DR2 in the drive electrode driver 15, via the switches S1 and S2.

As a result, the Vcom potential is output as the output signals SO1U to SOnU from the switches S1U to SnU of the driving signal selector unit 16U placed on the upper side, and as the output signals SO1L to SOnL from the switches S1L to SnL of the driving signal selector unit 16L placed on the lower side. In this manner, the Vcom potential is applied to the drive electrodes COML1 to COMLn.

<<Touch Detection Period (State (2))>>

Figure 12:
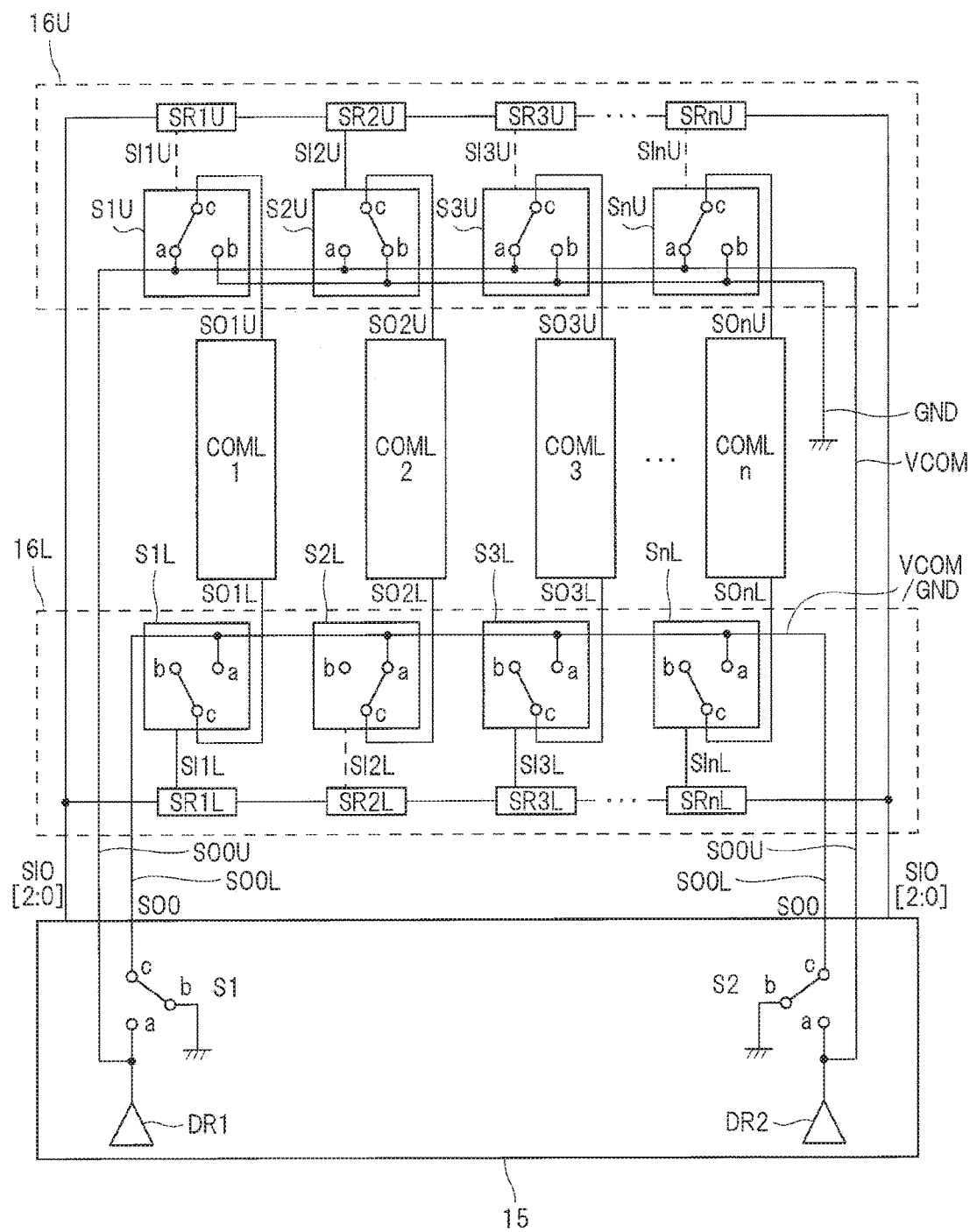
FIG. 12 is an explanatory diagram showing an example of an operation (touch detection period (state (2))) of the drive circuit of the drive electrode according to the first embodiment of the invention.

FIG. 12 shows the state of the drive electrode driver 15 and the driving signal selector units 16U and 16L in the touch detection period (state (2)). The state shown in FIG. 12 corresponds to the state (2) included in the touch detection period 2 (i.e., a state in which the shift registers SR2U and SR2L are selected) of FIG. 13.

In the touch detection periods 1 to n (state (2)), as shown in FIGS. 13 and 14, the start pulse signal SI0 [0] is a low level voltage signal, the clock signal SI0 [1] is a high level voltage signal, and the switch changeover signal SI0 [2] is a high level voltage signal. In the touch detection periods 1 to n (state (2)), the voltage of the switch changeover signal SI0 [2] is switched to the high level voltage. The signals SI0 [0], SI0 [1], and SI0 [2] (SI0 [2:0]) are provided from the drive electrode driver 15 to the shift registers SR1U to SRnU, and SR1L to SRnL of the driving signal selector units 16U and 16L.

In the touch detection periods 1 to n (state (2)), the output signal SO0, provided from the drivers DR1 and DR2 in the drive electrode driver 15 via the switches S1 and S2, is the driving signal of the GND potential. In the touch detection periods 1 to n (state (2)), the switches S1 and S2 in the drive electrode driver 15 are switched on, and the common terminal c is connected to the second terminal b connected to the GND potential. This means that the voltage of the output signal SO0 is switched to the GND potential, in the touch detection periods 1 to n (state (2)). As a result, the first terminal a of the switches S1L to SnL of the driving signal selector unit 16L placed on the lower side is connected to the GND potential. Meanwhile, a driving signal is provided from the drivers DR1 and DR2 in the drive electrode driver 15 to the first terminal a of the switches S1U to SnU of the driving signal selector unit 16U placed on the upper side, via the wiring line SO0U.

In the touch detection periods 1 to n (state (2)), since the switch changeover signal SI0 [2] is switched to a high level voltage signal, from among the switches S1U to SnU, the switches S1U to SnU corresponding to the selected shift registers SR1U to SRnU are switched on, in the driving signal selector unit 16U placed on the upper side. In FIG. 12, the switch S2U corresponding to the selected shift register SR2U is in the on state. The same applies to the case where another shift register is selected. In the driving signal selector unit 16L placed on the lower side, from among the switches S1L to SnL, the switches S1L to SnL corresponding to the unselected shift registers SR1L to SRnL are switched on. In FIG. 12, the switches S1L, and S3L to SnL corresponding to the unselected shift registers SR1L, and SR3L to SRnL are in the on state. The same applies to the case where the shift register different from the above is unselected. At the same time, the switches S1 and S2 on the drive electrode driver 15 side are switched to the GND potential side.

Specifically, in FIG. 12, since the switch changeover signal SI0 [2] is high level, the input signal SI2U from the selected shift register SR2U to the switch S2U is high level, in the driving signal selector unit 16U placed on the upper side. As a result, the switch S2U is switched on. In the meantime, the input signals SI1U, and SI3U to SInU from the unselected shift registers SR1U, and SR3U to SRnU to the switches S1U, and S3U to SnU are low level, in the driving signal selector unit 16U placed on the upper side. The switches S1U, and S3U to SnU, therefore, remain off.

Further, in FIG. 12, the input signals SI1L, and SI3L to SInL from the unselected shift registers SR1L, and SR3L to SRnL to the switches S1L, and S3L to SnL are high level, in the driving signal selector unit 16L placed on the lower side. As a result, the switches S1L, and S3L to SnL are switched on. In the meantime, the input signal SI2L from the selected shift register SR2L to the switch S2L is low level, in the driving signal selector unit 16L placed on the lower side. The switch S2L, therefore, remains off.

FIG. 12 also shows that the common terminal c is connected to the second terminal b connected to the ground wiring line GND in the switch S2U, which is switched on, of the driving signal selector unit 16U placed on the upper side. Meanwhile, the common terminal c is connected to the first terminal a that is connected to the output from the drivers DR1 and DR2 in the drive electrode driver 15, in the switches S1U, and S3U to SnU which remain off.

Further, FIG. 12 shows that the common terminal c is connected to the second terminal b which is in a high impedance state, in the switches S1L, and S3L to SnL, which are switched on, of the driving signal selector unit 16L placed on the lower side. Meanwhile, the common terminal c is connected to the first terminal a that is connected to the GND potential in the drive electrode driver 15, in the switch S2L which remains off.

As a result, FIG. 12 shows that the switch S2U corresponding to the selected shift register SR2U, in the driving signal selector unit 16U placed on the upper side, is connected to the ground wiring line GND, and the output signal SO2U from the switch S2U turns into the GND potential. FIG. 12 also shows that the switch S2L corresponding to the selected shift register SR2L, in the driving signal selector unit 16L placed on the lower side, is connected to the GND potential in the drive electrode driver 15, and the output signal SO2L from the switch S2L turns into the GND potential. The GND potential is thereby applied to the selected drive electrode COML2.

The GND potential connected to the switch S2L of the driving signal selector unit 16L placed on the lower side is the GND potential placed in the drive electrode driver 15. The GND potential is connected to the switch S2L via the switches S1 and S2 in the drive electrode driver 15. In the meantime, the GND potential connected to the switch S2U of the driving signal selector unit 16U placed on the upper side is the GND potential connected directly to the ground wiring line GND in the panel on which the drive electrodes COML1 to COMLn are formed. The GND potential is connected to the switch S2U without interposing the switches S1 and S2 of the drive electrode driver 15.

Further, FIG. 12 shows that the output signals SO1U, and SO3U to SOnU from the switches S1U, and S3U to SnU corresponding to the unselected shift registers SR1U, and SR3U to SRnU, in the driving signal selector unit 16U placed on the upper side, turn into the Vcom potential. FIG. 12 also shows that the output signals SO1L, SO3L to SOnL from the switches S1L, and S3L to SnL corresponding to the unselected shift registers SR1L, and SR3L to SRnL, in the driving signal selector unit 16L placed on the lower side, are in the high impedance state. The Vcom potential is thereby applied to the unselected drive electrodes COML1, and COML3 to COMLn.

In the configuration of the comparative example (FIG. 9) with respect to the present embodiment, in the touch detection period (state (2)), the GND potential connected to the switch S2U of the driving signal selector unit 16U placed on the upper side is the same as the GND potential connected to the switch S2L of the driving signal selector unit 16L placed on the lower side, that is, the GND potential placed in the drive electrode driver 15, via the switches S1 and S2. This configuration causes a problem of the poor convergence of potential fluctuation toward the GND potential.

The following is a description of a difference between the present embodiment and the comparative example in the convergence of potential fluctuation toward the GND potential, given with reference to FIGS. 15A, 15B, and 15C. FIGS. 15A, 15B, and 15C are explanatory diagrams showing the difference between the present embodiment and the comparative example in the convergence of potential fluctuation toward the GND potential.

When the driving signal is provided to the drive electrodes COML1 to COMLn, the GND potential is provided to the selected drive electrode. In FIGS. 15A, 15B, and 15C, the drive electrode COML1 is selected. In the example in which the driving signal is provided to the drive electrode COML1, FIG. 15A shows a waveform of the driving signal, FIG. 15B shows an enlarged waveform of the present embodiment, and FIG. 15C shows an enlarged waveform of the comparative example with respect to the present embodiment.

In the present embodiment shown in FIG. 15B, as compared with the comparative example with respect to the present embodiment shown in FIG. 15C, the potential fluctuation period in which the Vcom potential is switched to the GND potential is shortened by a shortening period. This is because the switch resistance is reduced in the present embodiment, by providing a path (the ground wiring line GND) leading to the GND potential placed on the panel on which the drive electrodes COML1 to COMLn are formed, without passing through the switches S1 and S2 in the drive electrode driver 15. The convergence of potential fluctuation toward the GND potential is improved by reducing the switch resistance.

Effect of Present Embodiment

With the above-described display with a touch detection function 1 according to the present embodiment, the convergence of potential fluctuation toward the GND potential is improved, while the switches S1 and S2 on the drive electrode driver 15 side are kept small. Specifically, the drive electrode COML selected at the time of touch detection is not connected to the GND potential placed in the drive electrode driver 15, via the switches S1 and S2, in the drive electrode driver 15, but is connected directly to the ground wiring line GND provided on the panel, so that the switches S1U to SnU, and S1L to SnL on the panel are controlled, in such a manner that the switches S1U to SnU, and S1L to SnL are switched on and off at the same timing as the drive changeover timing between the Vcom potential and the GND potential on the drive electrode driver 15 side. This avoids the necessity of considering, for the drive electrode driver 15, the current component flowing from the switches S1U to SnU, and S1L to SnL of the panel to the switches S1 and S2 in the drive electrode driver 15. As a result, the convergence of potential fluctuation toward the GND potential is improved, while the switches S1 and S2 on the drive electrode driver 15 side are kept small. The following is a detailed description.

(1) On the TFT substrate 21 having a plurality of drive electrodes COML formed thereon, the ground wiring line GND is formed, to which the drive electrode COML selected by the driving signal selector unit 16U is connected, in the touch detection period (state (2)). The selected drive electrode COML, therefore, is connected to the ground wiring line GND formed on the TFT substrate 21. This means that, in the present embodiment, the selected drive electrode COML is connected directly to the ground wiring line GND provided on the panel, instead of being connected to the GND potential via the switches S1 and S2 in the drive electrode driver 15, as in the case of the comparative example.

(2) In the touch detection period (state (2)), the drive electrode COML selected by the driving signal selector unit 16U is connected to the ground wiring line GND on the TFT substrate 21. At the same time, the drive electrode COML selected by the driving signal selector unit 16L is connected to the ground potential in the drive electrode driver 15, via the drive changeover wiring line VCOM/GND on the TFT substrate 21.

(3) In the touch detection period (state (2)), the drive electrode COML which is not selected by the driving signal selector unit 16U is connected to the driving signal wiring line VCOM on the TFT substrate 21. At the same time, the drive electrode COML which is not selected by the driving signal selector unit 16L is in a high impedance state.

(4) In the display period, the drive electrode COML selected by the driving signal selector unit 16U, and the unselected drive electrode COML, are connected to the driving signal wiring line VCOM on the TFT substrate 21. At the same time, the drive electrode COML selected by the driving signal selector unit 16L, and the unselected drive electrode COML, are connected to the drive changeover wiring line VCOM/GND on the TFT substrate 21.

(5) Each of the driving signal selector unit 16U and the driving signal selector unit 16L, includes a plurality of shift registers SR1U to SRnU, and SR1L to SRnL, and a plurality of switches S1U to SnU, and S1L to SnL. Each of the shift registers SR1U to SRnU and SR1L to SRnL, and each of the switches S1U to SnU and S1L to SnL correspond to each of the plurality of the drive electrodes COML. Each of the plurality of the shift registers SR1U to SRnU, and SR1L to SRnL is shift-controlled by the switch control signal SI0 [2:0] from the drive electrode driver 15, so that the switch corresponding to the drive electrode to be selected from among the plurality of the drive electrodes COML is switched on and off.

(6) In the touch detection period (state (2)), the switches S1U to SnU corresponding to the drive electrode COML selected by the driving signal selector unit 16U are switched on by a signal from the shift registers SR1U to SRnU respectively corresponding to the switches, so that the selected drive electrode COML is connected to the ground wiring line GND on the TFT substrate 21. At the same time, the switches S1L to SnL corresponding to the drive electrode COML selected by the driving signal selector unit 16L are switched off by a signal from the shift registers SR1L to SRnL respectively corresponding to the switches, so that the selected drive electrode COML is connected to the ground potential in the drive electrode driver 15, via the drive changeover wiring line VCOM/GND on the TFT substrate 21.

(7) In the touch detection period (state (2)), the switches S1U to SnU corresponding to the drive electrode COML which is not selected by the driving signal selector unit 16U are switched off by a signal from the shift registers SR1U to SRnU respectively corresponding to the switches, so that the unselected drive electrode COML is connected to the driving signal wiring line VCOM on the TFT substrate 21. At the same time, the switches S1L to SnL corresponding to the drive electrode COML which is not selected by the driving signal selector unit 16L are switched on by a signal from the shift registers SR1L to SRnL respectively corresponding to the switches, so that the unselected drive electrode COML is in a high impedance state.

(8) In the display period, the switches S1U to SnU corresponding to the drive electrode COML selected by the driving signal selector unit 16U, and the unselected drive electrode COML, are switched off by a signal from the shift registers SR1U to SRnU respectively corresponding to the switches, so that the selected drive electrode COML and the unselected drive electrode COML are connected to the driving signal wiring line VCOM on the TFT substrate 21. At the same time, the switches S1L to SnL corresponding to the drive electrode COML selected by the driving signal selector unit 16L, and the unselected drive electrode COML, are switched off by a signal from the shift registers SR1L to SRnL respectively corresponding to the switches, so that the selected drive electrode COML and the unselected drive electrode COML are connected to the drive changeover wiring line VCOM/GND on the TFT substrate 21.

(9) In the touch detection period (state (1)) in which each of the shift registers SR1U to SRnU, and SR1L to SRnL is shifted, from among the touch detection periods, the switches S1U to SnU corresponding to the drive electrode COML selected by the driving signal selector unit 16U, and to the unselected drive electrode COML, are switched off by a signal from the shift registers SR1U to SRnU respectively corresponding to the switches, so that the selected drive electrode COML and the unselected drive electrode COML are connected to the driving signal wiring line VCOM on the TFT substrate 21. At the same time, the switches S1L to SnL corresponding to the drive electrode COML selected by the driving signal selector unit 16L, and the unselected drive electrode COML, are switched off by a signal from the shift registers SR1L to SRnL respectively corresponding to the switches, so that the selected drive electrode COML and the unselected drive electrode COML are connected to the drive changeover wiring line VCOM/GND on the TFT substrate 21.

(10) The switch control signal SI0 [2:0] from the drive electrode driver 15 includes the start pulse signal SI0 [0] to start the operation, the clock signal SI0 [1] to synchronize the operations, and the switch changeover signal SI0 [2] to switch between the display operation and the touch detection operation. Each of the driving signal selector units 16U and 16L is controlled by the switch control signal SI0 [2:0].

(11) The display with a touch detection function 1 is formed by including the plurality of the drive electrodes COML, the drive electrode driver 15, the driving signal selector units 16U and 16L, the plurality of the touch detection electrodes TDL, the plurality of the pixel electrodes 22, the plurality of the pixel signal lines SGL, the plurality of the scanning signal lines GCL, the plurality of the liquid crystal elements LC, the gate driver 12, the source driver 13, and the source selector unit 14.

(12) The display with a touch detection function 1, with a structure of the detection region thereof divided lengthwise, is formed by: forming the plurality of the drive electrodes COML extending in the long side direction (in a lengthwise direction) of the TFT substrate 21; forming the plurality of the touch detection electrodes TDL extending in the short side direction (in a crosswise direction) of the TFT substrate 21; forming the plurality of the pixel signal lines SGL extending in the long side direction; and forming the plurality of the scanning signal lines GCL extending in the short side direction.

(13) The driving signal selector unit 16U, when seen in a plan view, is provided in such a way as to be opposed to one ends of the plurality of the drive electrodes COML in the extending direction thereof. The driving signal selector unit 16L is provided in such a way as to be opposed to the other ends of the plurality of the drive electrodes COML in the extending direction thereof. The driving signal selector unit 16L is placed between the other ends of the drive electrodes COML and the drive electrode driver 15. With this configuration, the switches S1U to SnU, and S1L to SnL of the driving signal selector units 16U and 16L are controlled, in such a manner that the switches S1U to SnU, and S1L to SnL are switched on and off at the same timing as the drive changeover timing between the Vcom potential and the GND potential on the drive electrode driver 15 side.

(14) As a result of (1) to (13) described above, it is not necessary to consider, for the drive electrode driver 15, the current component flowing from the switches S1U to SnU, and S1L to SnL of the driving signal selector units 16U and 16L to the switches S1 and S2 in the drive electrode driver 15. Consequently, the convergence of potential fluctuation toward the GND potential is improved, while the switches S1 and S2 on the drive electrode driver 15 side are kept small.

Second Embodiment

The display with a touch detection function, according to a second embodiment of the invention, will be described below with reference to FIGS. 16 to 17. The differences from the first embodiment will be mainly described in the second embodiment of the invention. FIGS. 16A and 16B are explanatory diagrams showing an example of a configuration of the drive electrode and a drive circuit thereof, according to the second embodiment of the invention. FIG. 17 is a timing chart showing an example of an operation (touch detection period (state (2))) of the drive circuit of the drive electrode according to the second embodiment of the invention.

In the touch detection period (state (2)), the output signal SO2U from the switch 52U corresponding to the selected shift register SR2U turns into the GND potential in the driving signal selector unit 16U placed on the upper side, as described with reference to FIGS. 12 to 14 in the first embodiment of the invention. Further, the output signal SO2L from the switch S2L corresponding to the selected shift register SR2L turns into the GND potential in the driving signal selector unit 16L placed on the lower side. The GND potential is thereby applied to the drive electrode COML2 selected as a touch detection electrode.

In contrast, the second embodiment of the invention shows an example in which a touch detection signal, which is a pulse signal obtained by repeating the GND potential and a TPH potential higher than the GND potential on the GND potential basis, is input to the drive electrode COML2 selected as a touch detection electrode.

COML2 represents a drive electrode selected as a touch detection electrode in FIGS. 16 and 17. SR2L, S2L, SW2L and ANDL respectively represent a shift register, a switch, a switch, a logical AND circuit, which are included in the driving signal selector unit 16L placed on the lower side of the drive electrode COML2. SR2U, S2U, SW2U and ANDU respectively represent a shift register, a switch, a switch, a logical AND circuit, which are included in the driving signal selector unit 16U placed on the upper side of the drive electrode COML2.

Each of SI2L and SI2U represents an input signal from the shift registers SR2L and SR2U to the switches S2L, S2U and the logical AND circuits ANDL and ANDU. Each of SO2L and SO2U represents an output signal from the switches SW2L and SW2U to the drive electrode COML2. Each of SO0L and SO0U represents a wiring line connected to the drive electrode driver 15. SW2TGL represents a touch detection control signal. The touch detection control signal SW2TGL is provided via a control wiring line connected to the drive electrode driver 15, for example. Hi-z represents a high impedance state. GND represents the GND potential. TPH represents a potential higher than the GND potential. Vcom represents a negative potential for the GND potential. The GND potential, the TPH potential and the Vcom potential are provided via a power supply wiring line connected to the drive electrode driver 15, for example.

The driving signal selector unit 16L placed on the lower side of the drive electrode COML2 includes the shift register SR2L, the switch S2L (second connecting line switch circuit), the switch SW2L (switch circuit for touch detection) and the logical AND circuit ANDL, as shown in FIG. 16A. The shift register SR2L and the switch S2L are the same as those in the first embodiment of the invention. The switch SW2L and the logical AND circuit ANDL are newly added in the second embodiment of the invention. Each of the switches S2L and SW2L is a changeover switch having a common terminal c, a first terminal a, and a second terminal b.

A first terminal a is in a high impedance state, a second terminal b is connected to the wiring line SO0L, and a common terminal c is connected to a first terminal a of the switch SW2L, in the switch S2L. The switch S2L is switched on and off by the input signal SI2L provided from the shift register SR2L.

A first terminal a is connected to a common terminal c of the switch S2L, a second terminal b is connected to the TPH potential, and a common terminal c is connected to the drive electrode COML2, in the switch SW2L. The switch SW2L is switched on and off by the result of having the input signal SI2L provided from the shift register SR2L and the touch detection control signal SW2TGL subjected to the logical AND operation in the logical AND circuit ANDL. The output signal SO2L from the switch SW2L is provided to the drive electrode COML2.

Further, the driving signal selector unit 16U placed on the upper side of the drive electrode COML2 includes the shift register SR2U, the switch S2U (first connecting line switch circuit), the switch SW2U (switch circuit for touch detection) and the logical AND circuit ANDU, as shown in FIG. 16B. The shift register SR2U and the switch S2U are the same as those in the first embodiment of the invention. The switch SW2U and the logical AND circuit ANDU are newly added in the second embodiment of the invention. Each of the switches S2U and SW2U is a changeover switch having a common terminal c, a first terminal a, and a second terminal b.

A first terminal a is connected to the wiring line SO0U, a second terminal b is connected to the GND potential, and a common terminal c is connected to a first terminal a of the switch SW2U, in the switch S2U. The switch S2U is switched on and off by the input signal SI2U provided from the shift register SR2U.

A first terminal a is connected to a common terminal c of the switch S2U, a second terminal b is connected to the TPH potential (high potential wiring line), and a common terminal c is connected to the drive electrode COML2, in the switch SW2U. The switch SW2U is switched on and off by the result of having the input signal SI2U provided from the shift register SR2U and the touch detection control signal SW2TGL subjected to the logical AND operation in the logical AND circuit ANDU. The output signal SO2U from the switch SW2U is provided to the drive electrode COML2.

In the touch detection period (state (2)), the input signals SI2U and SI2L are provided from the shift registers SR2U and SR2L corresponding to the drive electrode COML2 that is a touch detection object, and turn into high level signals, as shown in FIG. 17. Further, a pulse signal obtained by repeating high level and low level is provided as the touch detection control signal SW2TGL.

In the touch detection period, the output signals SO2L and SO2U are provided, as the touch detection signals, to the drive electrode COML2 selected as a touch detection electrode by switching on and off the switches SW2L and SW2U repeatedly (for example, switching to the first terminal a when switched on, and switching to the second terminal b when switched off).

In the switch SW2L, for example, when the input signal SI2L is at high level, a signal of the second terminal b of the switch S2L (wiring line SO0L is the GND potential) is selected, and the TPH potential is selected by switching performed by the touch detection control signal SW2TGL. Further, in the switch SW2U, when the input signal SI2U is at high level, a signal of the second terminal b of the switch S2U (GND potential) is selected, and the TPH potential is selected by switching performed by the touch detection control signal SW2TGL.

Accordingly, the touch detection signal, which is the pulse signal obtained by repeating the GND potential and the TPH potential, is provided, as the output signals SO2L and SO2U from the switches SW2L and SW2U, to the respective drive electrodes COML2 selected as the touch detection electrodes.

Further, the output signals SO1L, and SO3L to SOnL in a high impedance state are provided to the drive electrodes COML1, and COML3 to COMLn not selected as the touch detection electrodes, and the output signals SO1U, and SO3U to SOnU of the Vcom potential are also provided thereto.

In the second embodiment of the invention, the Vcom potential shown in FIG. 17 is a potential to be provided to the drive electrode not selected as the touch detection electrode in the touch detection period, as described above. Further, the Vcom potential is also a potential as a display driving signal to be provided to the drive electrode, in the display period. The driving signal Vcom shown in FIGS. 6 and 7 corresponds to the touch detection signal that is the pulse signal obtained by repeating the GND potential and the TPH potential shown in FIG. 17.

The same effect as that of the first embodiment of the invention described above can be obtained, in the display with a touch detection function according to the second embodiment of the invention.

In the category of the idea of the present invention, a person with ordinary skill in the art can conceive various modification examples and revised examples, and such modification examples and revised examples are also deemed to belong to the scope of the present invention. For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

Further, with respect to other actions and effects which are brought about by the aspects described in the above-described embodiments, those which are apparent from the descriptions of the present specification and those which can be properly conceived by a person with ordinary skill in the art are deemed to be brought about by the present invention as a matter of course.

What is claimed is:

1. A display comprising:
   a plurality of drive electrodes for display and touch detection;
   a drive electrode driver configured to apply a driving signal to each of the plurality of the drive electrodes; and
   first driving signal selector circuitry and second driving signal selector circuitry configured to select each of the plurality of the drive electrodes to which the drive electrode driver applies the driving signal,
   wherein a touch detection period and a display period alternate with each other, and in the touch detection period, the drive electrode driver provides a driving signal for touch detection to the drive electrode, and in the display period, the drive electrode driver provides a driving signal for display to the drive electrode, and
   a ground wiring line to which the drive electrode selected by the first driving signal selector circuitry is connected in the touch detection period is formed on a substrate on which the plurality of the drive electrodes are formed,
   wherein, in the touch detection period, the drive electrode selected by the first driving signal selector circuitry is connected to the ground wiring line on the substrate, the drive electrode selected by the second driving signal selector circuitry is connected to a ground potential in the drive electrode driver, the drive electrode which is not selected by the first driving signal selector circuitry is connected to a driving signal wiring line on the substrate, and the drive electrode which is not selected by the second driving signal selector circuitry is in a high impedance state.

2. The display according to claim 1, wherein, in the display period, the drive electrode selected by the first driving signal selector circuitry, and the unselected drive electrode are connected to the driving signal wiring line on the substrate, and the drive electrode selected by the second driving signal selector circuitry, and the unselected drive electrode are connected to a drive changeover wiring line on the substrate.

3. A display according to claim 2, comprising:

a plurality of drive electrodes for display and touch detection;

a drive electrode driver configured to apply a driving signal to each of the plurality of the drive electrodes; and a first driving signal selector circuitry and a second driving signal selector circuitry configured to select each of the plurality of the drive electrodes to which the drive electrode driver applies the driving signal, wherein a touch detection period and a display period alternate with each other, and in the touch detection period, the drive electrode driver provides a driving signal for touch detection to the drive electrode, and in the display period, the drive electrode driver provides a driving signal for display to the drive electrode, a ground wiring line to which the drive electrode selected by the first driving signal selector circuitry is connected in the touch detection period is formed on a substrate on which the plurality of the drive electrodes are formed, each of the first driving signal selector circuitry and the second driving signal selector circuitry includes a plurality of shift registers and a plurality of switches, each of the shift registers and each of the switches corresponding to each of the plurality of the drive electrodes, and each of the plurality of the shift registers is shift-controlled by a control signal from the drive electrode driver so that the switch corresponding to the drive electrode to be selected from among the plurality of the drive electrodes is switched on and off.

4. The display according to claim 3, wherein, in the touch detection period, the switch corresponding to the drive electrode selected by the first driving signal selector circuitry is switched on by a signal from the shift register corresponding to the switch, so that the selected drive electrode is connected to the ground wiring line on the substrate, and the switch corresponding to the drive electrode selected by the second driving signal selector circuitry is switched off by a signal from the shift register corresponding to the switch, so that the selected drive electrode is connected to the ground potential in the drive electrode driver.

5. The display according to claim 4, wherein, in the touch detection period, the switch corresponding to the drive electrode which is not selected by the first driving signal selector circuitry is switched off by a signal from the shift register corresponding to the switch, so that the unselected drive electrode is connected to the driving signal wiring line on the substrate, and the switch corresponding to the drive electrode which is not selected by the second driving signal selector circuitry is switched on by a signal from the shift register corresponding to the switch, so that the unselected drive electrode is in a high impedance state.

6. The display according to claim 5, wherein, in the display period, the switch corresponding to the drive electrode selected by the first driving signal selector circuitry and the unselected drive electrode, is switched off by a signal from the shift register corresponding to the switch, so that the selected drive electrode and the unselected drive electrode are connected to the driving signal wiring line on the substrate, and the switch corresponding to the drive electrode selected by the second driving signal selector circuitry and the unselected drive electrode, is switched off by a signal from the shift register corresponding to the switch, so that the selected drive electrode and the unselected drive electrode are connected to the drive changeover wiring line on the substrate.

7. The display according to claim 6, wherein the touch detection period includes a shifting period in which each of the plurality of the shift registers of the first driving signal selector circuitry and the second driving signal selector circuitry is shifted, in the shifting period, the switch corresponding to the drive electrode selected by the first driving signal selector circuitry and the unselected drive electrode, is switched off by a signal from the shift register corresponding to the switch, so that the selected drive electrode and the unselected drive electrode are connected to the driving signal wiring line on the substrate, and the switch corresponding to the drive electrode selected by the second driving signal selector circuitry and the unselected drive electrode, is switched off by a signal from the shift register corresponding to the switch, so that the selected drive electrode and the unselected drive electrode are connected to the drive changeover wiring line on the substrate.

8. The display according to claim 3, wherein the control signal from the drive electrode driver includes a start pulse signal to start an operation, a clock signal to synchronize operations, and a switch changeover signal to switch between a display operation and a touch detection operation.

9. A display comprising:

a plurality of drive electrodes for display and touch detection;

a drive electrode driver configured to apply a driving signal to each of the plurality of the drive electrodes; and a first driving signal selector circuitry and a second driving signal selector circuitry configured to select each of the plurality of the drive electrodes to which the drive electrode driver applies the driving signal, wherein a switch circuit for touch detection, which forms a driving signal for touch detection, is provided in each of the first driving signal selector circuitry and the second driving signal selector circuitry, a touch detection period and a display period alternate with each other, and in the touch detection period, the switch circuit for touch detection provides a driving signal for touch detection to the drive electrode, and in the display period, the drive electrode driver provides a driving signal for display to the drive electrode, a ground wiring line to which the drive electrode selected by the first driving signal selector circuitry is connected in the touch detection period is formed on a substrate on which the plurality of the drive electrodes are formed, the first driving signal selector circuitry includes a first connecting line switch circuit configured to switch on and off the ground wiring line and the switch circuit for touch detection, and a high potential wiring line set to at least a higher potential than the ground wiring line, the switch circuit for touch detection switches a connection between the first connecting line switch circuit and the drive electrode, and a connection between the high potential wiring line and the drive electrode, the first driving signal selector circuitry includes a plurality of shift registers respectively corresponding to the plurality of the drive electrodes, and each of the plurality of the shift registers is shift-controlled by a control signal from the drive electrode driver so that the first connecting line switch circuit and the switch circuit for touch detection, corresponding to the drive electrode to be selected from among the plurality of the drive electrodes, are switched on and off.

10. A display comprising:
a plurality of drive electrodes for display and touch detection;
a drive electrode driver configured to apply a driving signal to each of the plurality of the drive electrodes; and
a first driving signal selector circuitry and a second driving signal selector circuitry configured to select each of the plurality of the drive electrodes to which the drive electrode driver applies the driving signal, wherein a switch circuit for touch detection, which forms a driving signal for touch detection, is provided in each of the first driving signal selector circuitry and the second driving signal selector circuitry, a touch detection period and a display period alternate with each other, and in the touch detection period, the switch circuit for touch detection provides a driving signal for touch detection to the drive electrode, and in the display period, the drive electrode driver provides a driving signal for display to the drive electrode, a ground wiring line to which the drive electrode selected by the first driving signal selector circuitry is connected in the touch detection period is formed on a substrate on which the plurality of the drive electrodes are formed, the second driving signal selector circuitry includes a second connecting line switch circuit configured to switch on and off a connection with a ground potential in the drive electrode driver, and a high potential wiring line set to at least a higher potential than the ground potential, the switch circuit for touch detection switches a connection between the second connecting line switch circuit and the drive electrode, and a connection between the high potential wiring line and the drive electrode, the second driving signal selector circuitry includes a plurality of shift registers respectively corresponding to the plurality of the drive electrodes, and each of the plurality of the shift registers is shift-controlled by a control signal from the drive electrode driver so that the second connecting line switch circuit and the switch circuit for touch detection, corresponding to the drive electrode to be selected from among the plurality of the drive electrodes, are switched on and off.

* * * * *